(12) United States Patent
Suetake et al.

(10) Patent No.: US 8,606,195 B2
(45) Date of Patent: Dec. 10, 2013

(54) RADIO

(75) Inventors: Hiroyasu Suetake, Osaka (JP);
Hiroyuki Takebe, Osaka (JP); Toshinori Kondo, Osaka (JP)

(73) Assignee: Sharp Kabushiki Kaisha, Tokyo (JP)

( * ) Notice: Subject to any disclaimer, the term of this patent is extended or adjusted under 35 U.S.C. 154(b) by 177 days.

(21) Appl. No.: 12/996,666

(22) PCT Filed: Jun. 16, 2009

(86) PCT No.: PCT/JP2009/060949
§ 371 (c)(1),
(2), (4) Date: Dec. 7, 2010

(87) PCT Pub. No.: WO2009/157343
PCT Pub. Date: Dec. 30, 2009

(65) Prior Publication Data
US 2011/0081954 A1    Apr. 7, 2011

(30) Foreign Application Priority Data

Jun. 27, 2008  (JP) ................................ 2008-169208

(51) Int. Cl.
*H04B 1/46* (2006.01)
*H04B 1/44* (2006.01)

(52) U.S. Cl.
USPC ......... 455/82; 455/83; 455/575.5; 455/575.7; 455/121

(58) Field of Classification Search
USPC .................... 455/82, 83, 575.5, 575.7, 121
See application file for complete search history.

(56) References Cited

U.S. PATENT DOCUMENTS

| | | | | |
|---|---|---|---|---|
| 7,292,705 B2* | 11/2007 | Harano | ........................ | 381/384 |
| 7,424,316 B1* | 9/2008 | Boyle | ........................ | 455/575.7 |
| 7,840,242 B2* | 11/2010 | Yoshino | ..................... | 455/575.2 |

(Continued)

FOREIGN PATENT DOCUMENTS

| | | |
|---|---|---|
| JP | 2000-78044 A | 3/2000 |
| JP | 2001-326514 A | 11/2001 |

(Continued)

OTHER PUBLICATIONS

Chinese Office Action, dated Dec. 5, 2012 for Chinese Application No. 200980124009.0.

(Continued)

*Primary Examiner* — Wen Huang
(74) *Attorney, Agent, or Firm* — Birch, Stewart, Kolasch & Birch, LLP

(57) ABSTRACT

In a mobile phone, a vibrator, arranged on a substrate, has two power supply terminals. The vibrator's first and second terminals are each connected to a control unit via a first wiring, a coil and a second wiring. A capacitor is connected between the two terminals' first wirings One end of an antenna sub-element is connected to the first terminal's first wiring and one end is connected to a radio circuit unit. An antenna unit operates at frequency $\lambda 2$, corresponding to a communication frequency. The control unit and the vibrator operate at frequency $\lambda 1$. The coils have a self-resonant frequency of $\lambda 2$ and form a short-circuit connection at frequency $\lambda 1$ and an open-circuit connection at frequency $\lambda 2$. The capacitors form an open-circuit connection at frequency $\lambda 1$ and a short-circuit connection at frequency $\lambda 2$. This reduces the number of antenna component members mounted on a radio and an antenna's size.

4 Claims, 33 Drawing Sheets

(56) References Cited

U.S. PATENT DOCUMENTS

| | | |
|---|---|---|
| 2004/0171404 A1* | 9/2004 | Annamaa et al. .......... 455/550.1 |
| 2007/0035458 A1 | 2/2007 | Ohba |
| 2007/0105438 A1 | 5/2007 | Yoshino |
| 2009/0005110 A1* | 1/2009 | Ozden ....................... 455/550.1 |

FOREIGN PATENT DOCUMENTS

| | | |
|---|---|---|
| JP | 2003-198694 A | 7/2003 |
| JP | 2006-135721 A | 5/2006 |
| JP | 2006-245866 A | 9/2006 |
| JP | 2007-49325 A | 2/2007 |
| JP | 2007-194803 A | 8/2007 |
| JP | 2008-61009 A | 3/2008 |

OTHER PUBLICATIONS

Japanese Office Action, dated Jan. 8, 2013 for Japanese Application No. 2010-517924.

Extended European Search Report, dated Jan. 23, 2013, for European Patent Application No. 09770053.8.

* cited by examiner (a)

(d)

<Pass characteristic of coil a104 and coil b107>

(e)

<Pass characteristic of capacitor a110 and capacitor b111>

(Equivalent circuit at frequency $\lambda_2$)

(Equivalent circuit at frequency $\lambda_2$
When none of coil a104 or coil b107 is provided)

(g) Case where terminals of vibrator form open-circuit connection (h) Case where terminals of vibrator are capacitively coupled (No capacitor b)

(No capacitor b or coil b)

(a)

(b)

(c)

(a)

(b) (Special price circuit at frequency $\lambda_1$)

(c) (Special price circuit at frequency $\lambda_2$)

Measurement condition 1) Evaluation substrate when antenna feeding is performed to only one terminal of mount-type vibrator Measurement condition 2) Evaluation substrate when antenna feeding is performed to two terminals of mount-type vibrator Measurement condition 3) Evaluation substrate when antenna feeding is performed to two terminals and shield member of mount-type vibrator (e) ZX plane average gain characteristics (Etotal)

Average gain frequency characteristics (zx surface E(total))

(f) Return loss characteristics (a)

(b)

(Equivalent circuit at frequency $\lambda_1$)

(c)

(Equivalent circuit at frequency $\lambda_2$)

(a)

(b)

(c)

(a)

<Open state (Front)>

(b-1)

<Closed state (Front)>

(b-2)

<Closed state (Back)>

(c)

<Closed state (Back)>

(d)

<Details of first substrate 610 (Enlarged view)>   <(Cross-sectional view)>

(a) <Open state>

(b) <Closed state (Front)>

(c) <Closed state (Back)>

(d) <Closed state (Back)>

(e) <Details of first substrate 710 (Enlarged view)>    <(Cross-sectional view)>

(f)

<Circuit configuration diagram of case where present invention is applied to speaker arranged in hinge>

(a-1) 
<Open state>

(a-2) 
<Open state (When second housing is rotated)>

(b) 
<Closed state (Front)>

(c) 
<Closed state (back)>

<Closed state (Back)>

<Details of first substrate 710 (Enlarged view)>   <(Cross-sectional view)>

(a)

(b)

(c)

(Equivalent circuit for operating vibrator)

(d)

(Equivalent circuit for operating antenna unit)

(a)

(b)

(Special price circuit at frequency $\lambda_1$)

(c)

(Special price circuit at frequency $\lambda_2$)

(d)

Electrical length λ/4

Substrate GND

Substrate 301

(Equivalent circuit at frequency $\lambda_2$)

RADIO

TECHNICAL FIELD

The present invention relates to a radio, and particularly to reduction in size of an antenna of the radio.

BACKGROUND ART

In recent years, a radio represented by a mobile phone, a PDA terminal or the like has been increasingly reduced in size and thickness, and furthermore, has employed a built-in antenna for enhancement of design of the radio. In addition, functions of the radio have been diversified, so that the radio is not only capable of voice calls but also has an international roaming function, a one seg audio visual function, a GPS function, a wireless LAN communication function, a Bluetooth (registered trademark) communication function and the like. Thus, antennas for respective functions have been required. For this reason, it has become necessary to arrange many antennas in a limited space of the radio.

In arranging many antennas, a relatively large electronic component such as a vibrator used as an essential function in a radio may be more often arranged close to an antenna. For this reason, there may be a case where a layout of an antenna element is limited or a case where a certain distance needs to be secured between the antenna and the electronic component. Consequently, it has become difficult to further reduce the antenna in size.

In a technique described in Patent Document 1 below, disclosed is a technique of reducing a device in size and simplifying a configuration thereof by combining a built-in antenna module and another electronic component.

Patent Document 1: Japanese Patent Application Publication No. 2006-245866

DISCLOSURE OF THE INVENTION

Problem to be Solved by the Invention

In the technique described in Patent Document 1 above, disclosed is a technique of causing the electronic component to operate as a part of a loop antenna by causing two antenna elements to also serve as two wirings of the electronic component. However, since the technique described in Patent Document 1 employs a loop antenna as an antenna system, it is necessary to secure an electrical length of the antenna elements equivalent to a wavelength $\lambda$. For example, in a 2-GHz band for a cellular antenna of a mobile radio terminal, an electrical length of approximately 15 cm needs to be secured for an antenna element. It is understood that an antenna has a large volume relative to a housing, of a general mobile radio terminal, which measures 10 cm in length×5 cm in width. In addition, when GSM900 for the international roaming function is taken into consideration, an electrical length of approximately 33 cm needs to be secured for an antenna element, in a 900-MHz band. This enlarges the antenna volume even more. Moreover, it is more difficult to arrange the antennas when the arranging of multiple antennas required by the multi-functionalization of a mobile radio terminal in recent years is taken into consideration. Thus, the technique described in Patent Document 1 has a problem that a volume of an antenna is enlarged.

The present invention has been made in view of such a problem, and an object thereof is reduction in size of an antenna by causing an electronic component to operate as a part of a monopole antenna.

Means for Solving the Problem

A mobile terminal according to the present invention is characterized by reducing an antenna in size by causing the antenna to operate as a monopole antenna as a result of performing antenna feeding directly to terminals of an electronic component.

According to an aspect of the present invention, provided is a radio characterized by comprising: an electronic component; a control circuit unit which is connected to the electronic component and which controls the electronic component at a first frequency; and a radio circuit unit which is connected to the electronic component and a ground, and which operates at a second frequency different from the first frequency, the radio characterized in that the electronic component does not have a low-impedance connection to the ground at the second frequency.

The radio circuit unit is connected to the ground and the electronic component does not have a low-impedance connection to the ground at the second frequency. Thus, the electronic component can be operated as a monopole antenna. Since the electrical length of the monopole antenna is $\lambda/4$ with respect to a wavelength the electrical length of the antenna can be ¼ in comparison with a $\lambda$ loop antenna. This can reduce the antenna in size. In addition, the electronic component is operated as the monopole antenna, and thereby the ground can be utilized for antenna radiation even in a case where the electronic component has a small antenna volume. Thus, a favorable antenna characteristic can be obtained.

In addition, provided is a radio characterized by comprising: an electronic component; a control circuit unit which is connected to the electronic component and which controls the electronic component at a first frequency; and a radio circuit unit which is connected to the electronic component and a ground, and which operates at a second frequency different from the first frequency, the radio characterized in that at least at the second frequency, the electronic component and the ground are connected to each other only via the radio circuit unit. At the second frequency, the radio does not have another line directly connected to the ground as in Part (b) in FIG. 6 in Patent Document, for example.

Note that it is preferable that the radio includes a high-frequency cutoff unit which is inserted between the electronic component and the control circuit unit and which forms a connection between the electronic component and the control circuit unit so that the connection therebetween has a high impedance at the second frequency. When the electronic component is used as an antenna, this can check an impact of impedance due to connection with the circuit control unit, and check degrading of an antenna characteristic.

The radio may also include a first high-frequency short-circuit unit which is inserted between the electronic component and the radio circuit unit and which forms a connection between the electronic component and the radio circuit unit so that the connection therebetween has a high impedance at the first frequency and has a low impedance at a second frequency. This makes it possible to cause the electronic component to operate as the antenna without giving an impact on an operation of the control circuit unit.

In the above configuration, the electronic component may include a first terminal and a second terminal, and the radio circuit unit may be connected to the first terminal and the second terminal. This makes it possible to configure the antenna without depending on the connection state between the terminals inside the electronic component.

Further, the first terminal and the second terminal may be provided within a connection path between the electronic component and the control circuit unit, and the radio may comprise a second high-frequency short-circuit unit which is connected to the first terminal and the second terminal and which forms a connection between the first terminal and the second terminal so that the connection therebetween has a high impedance at the first frequency and has a low impedance at a second frequency. This makes it possible to perform antenna feeding to the multiple terminals without giving an impact on the operation of the control circuit unit and to configure the antenna without depending on the connection state between the terminals inside the electronic component.

The radio may comprise a reinforcing shield member which reinforces the electronic component, and antenna feeding may be performed to the reinforcing shield member. Otherwise, that antenna feeding may be performed to all of the terminals of the electronic component.

Effects of the Invention

According to the present invention, the electronic component itself is utilized as an antenna and further is configured to operate as a monopole antenna. This makes it possible to reduce an antenna in size in a radio. In addition, the present invention has an effect that a favorable antenna characteristic can be obtained even in a case where the electronic component has a small antenna volume.

Figure 2A:
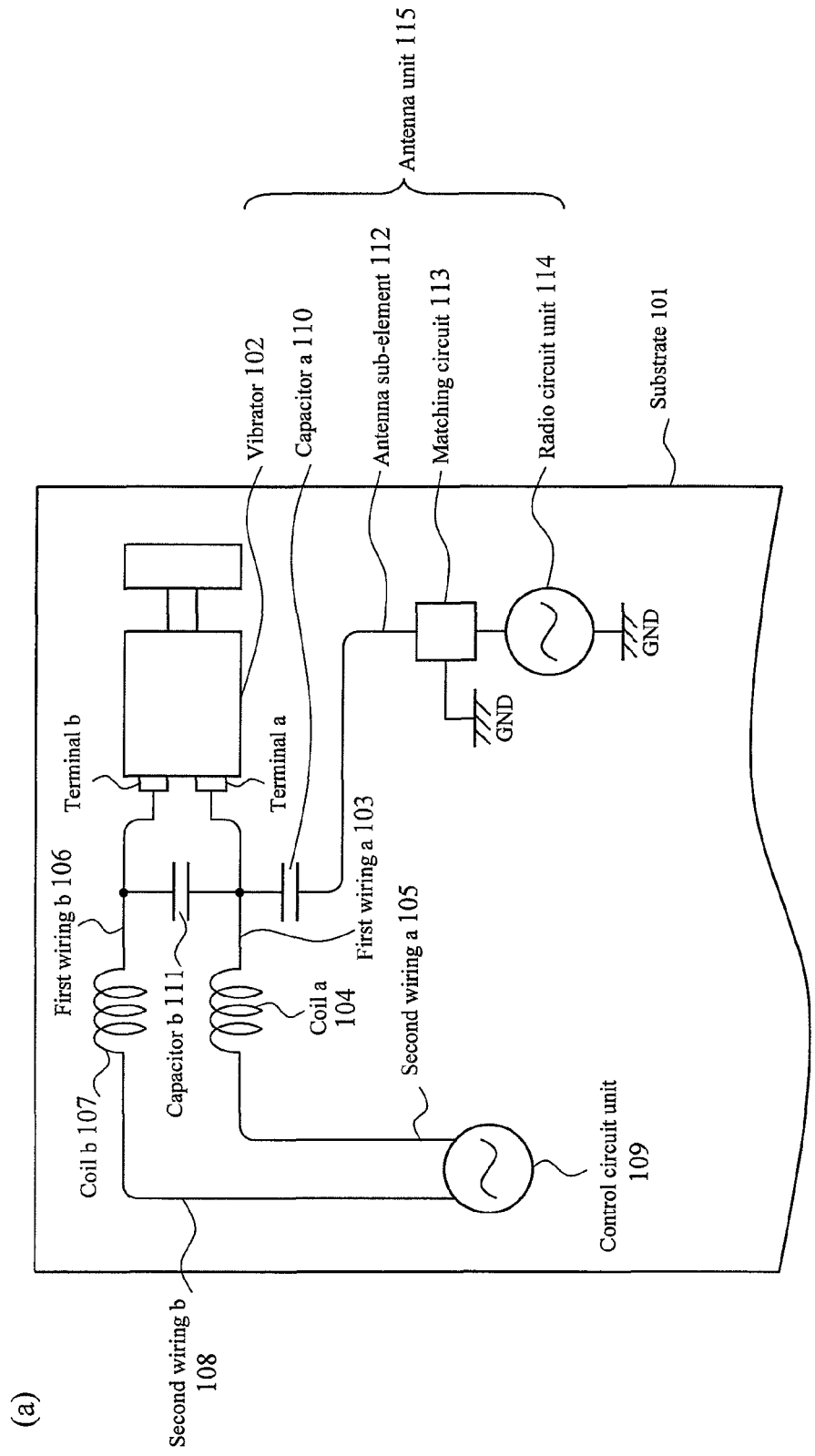
FIG. 2A is a diagram showing a part of configuration example of a substrate provided in a housing of a mobile phone according to a first embodiment of the present invention.
Figure 2B:
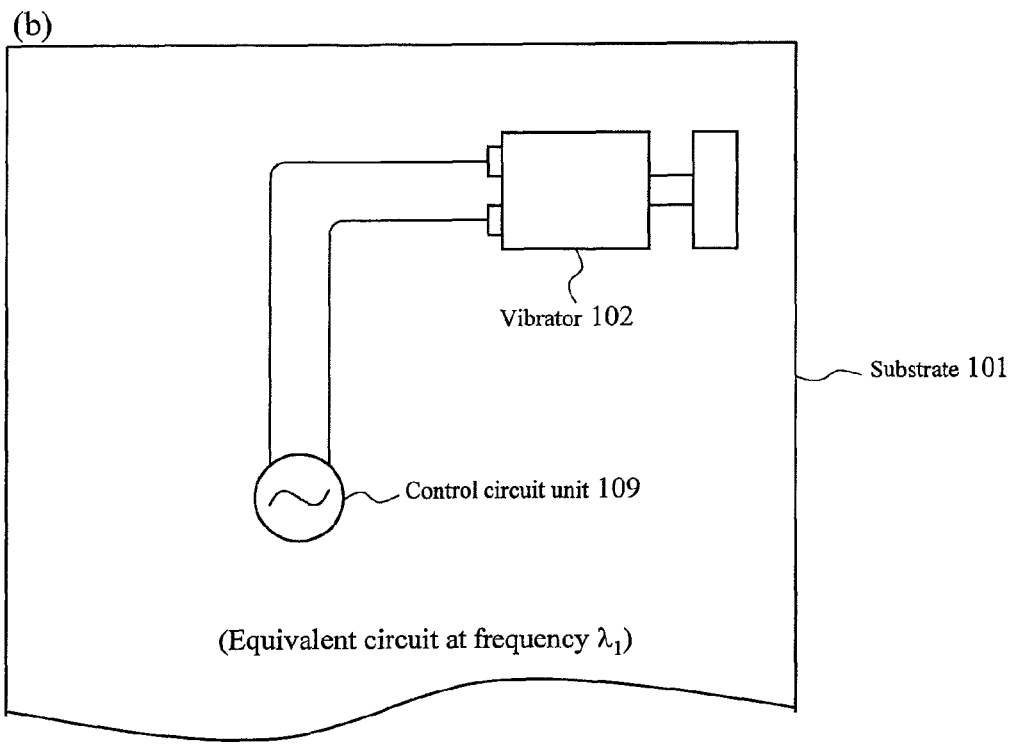
Figure 2B:
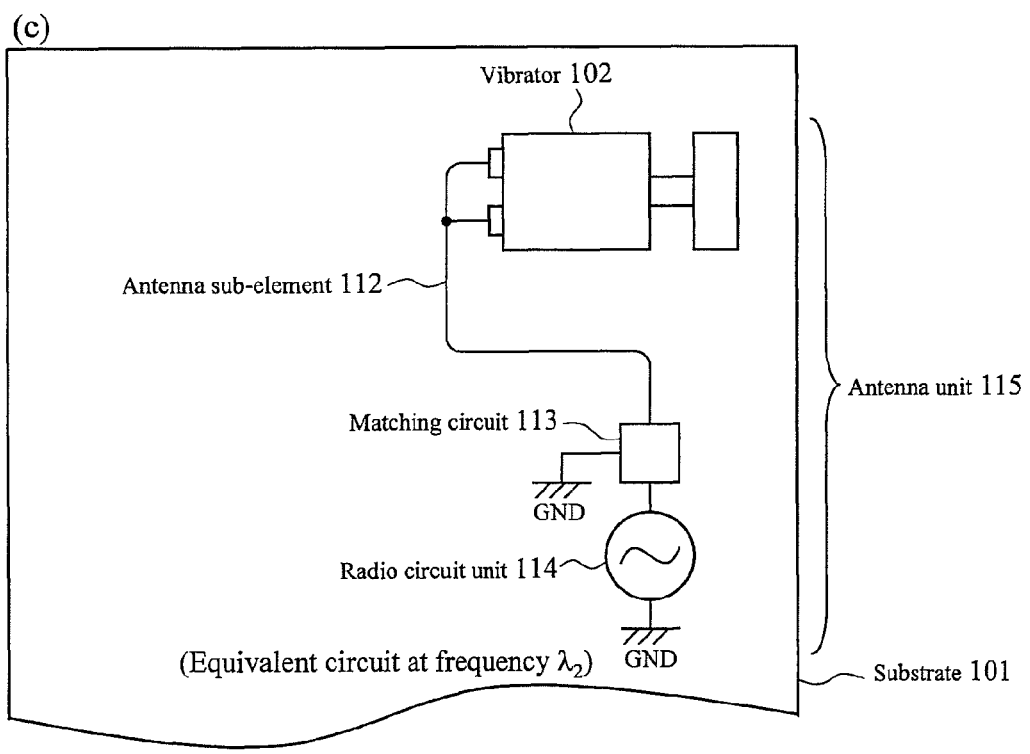

Part (b) in FIG. 2B is a diagram showing an equivalent circuit in a case where a vibrator operates at a frequency $\lambda 1$ in the mobile phone in this embodiment. Part (c) in FIG. 2B is a diagram showing an equivalent circuit, concerning the mobile phone in this embodiment, in a case where an antenna unit operates at a frequency $\lambda 2$.

Figure 2C:
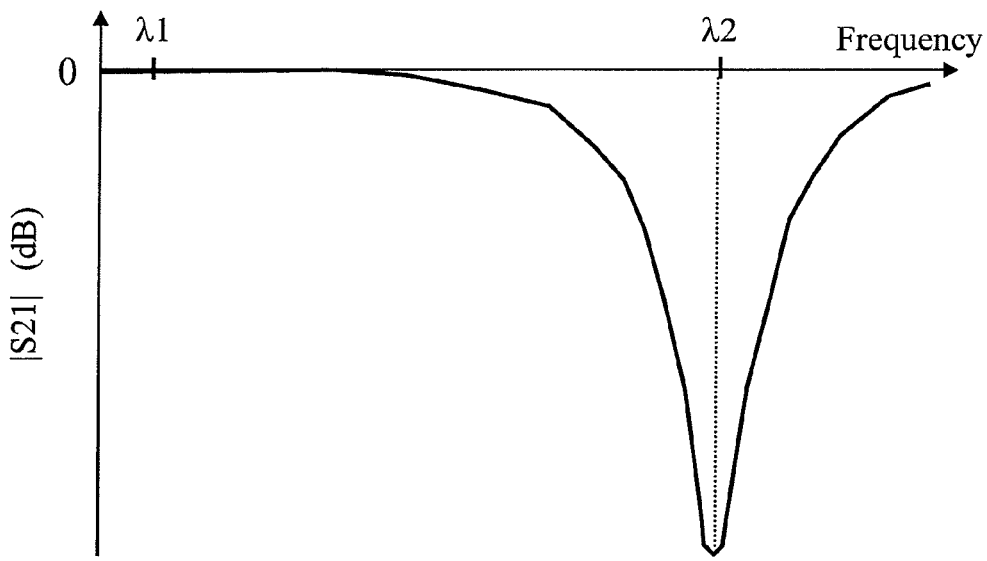
Figure 2C:
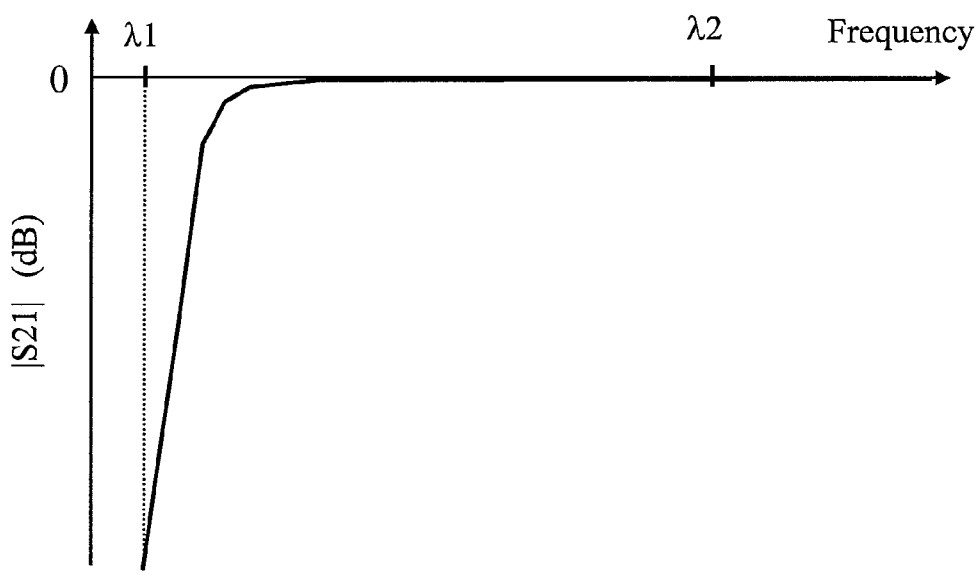

Part (d) in FIG. 2C is a characteristic graph obtained when the mobile phone is designed so as to have such a pass characteristic that a short-circuit connection is formed at the frequency $\lambda 1$ and an open-circuit connection is formed at the frequency $\lambda 2$. Part (e) in FIG. 2C is a characteristic graph obtained when the mobile phone is designed so as to have such a pass characteristic that an open-circuit connection is formed at the frequency $\lambda 1$ and a short-circuit connection is formed at the frequency $\lambda 2$.

Figure 2D:
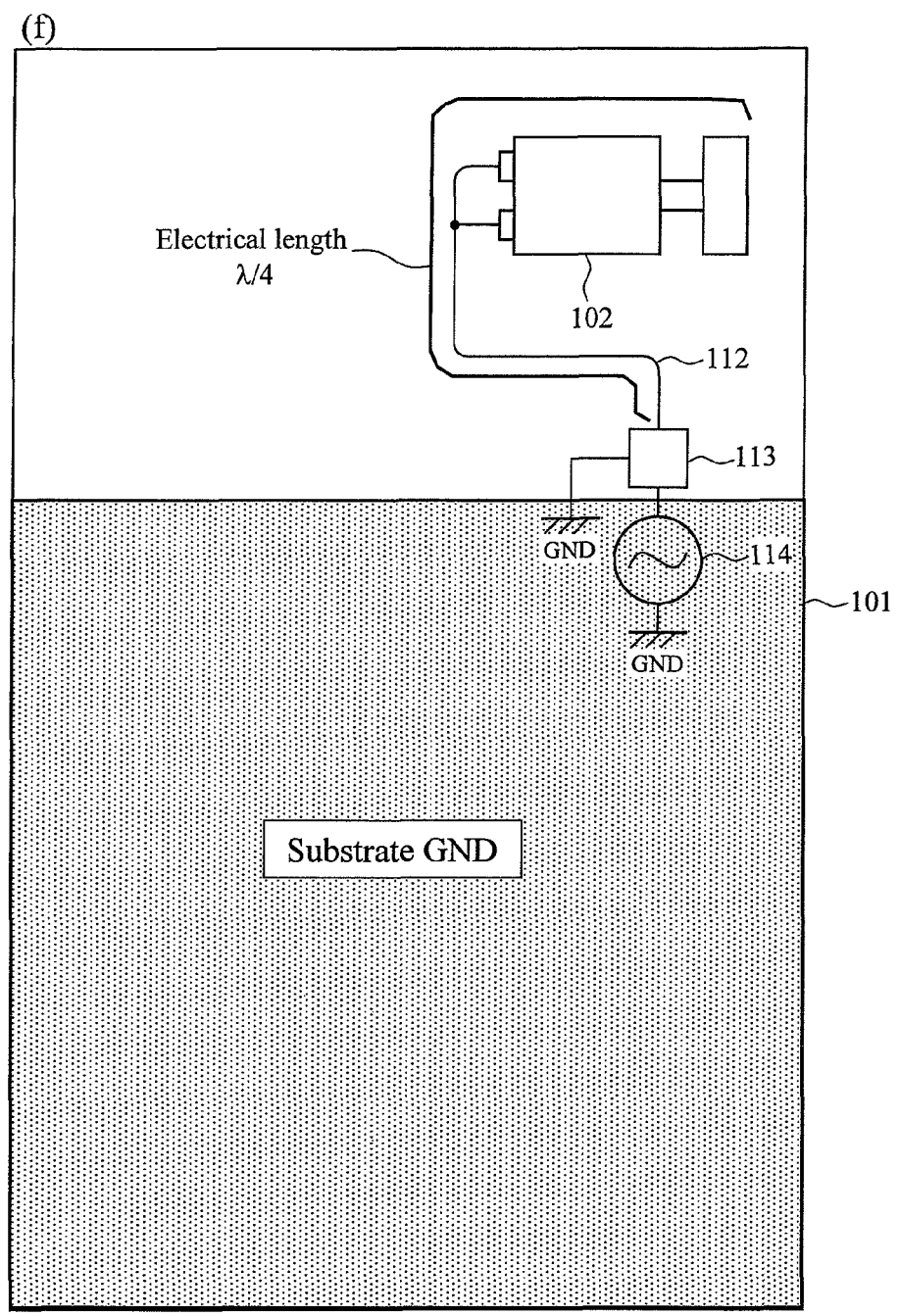

FIG. 2D is a diagram showing a configuration example with a ground conductor of a substrate taken into consideration as well.

Figure 2E:
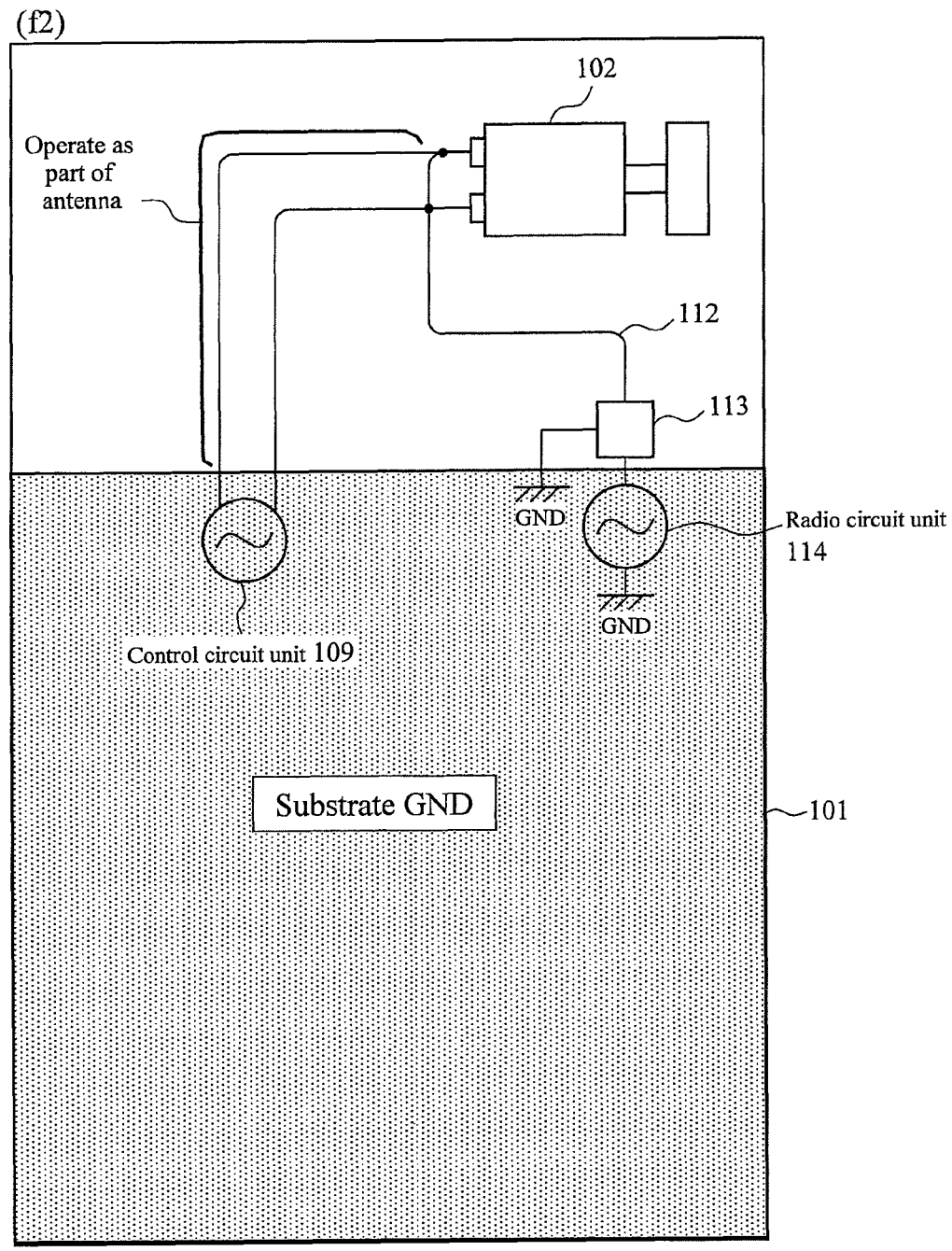

FIG. 2E is an equivalent circuit diagram at the frequency $\lambda 2$ in a case of no coil.

Figure 2F:
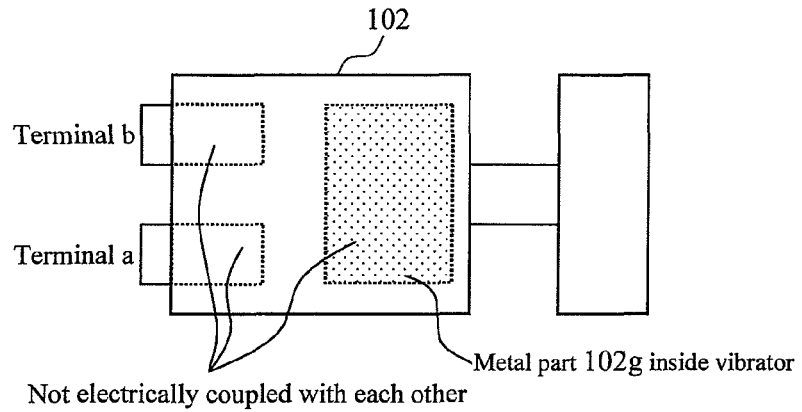
Figure 2F:
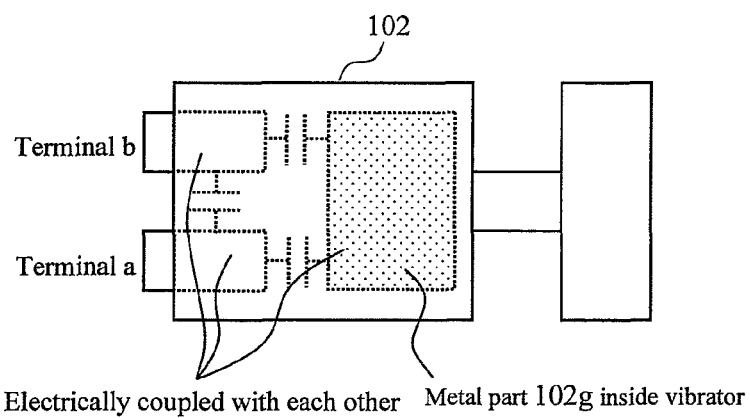

Part (g) in FIG. 2F is an example of a case where terminals of a vibrator form an open-circuit connection. Part (h) in FIG. 2F is an example of a case where the terminals of the vibrator are capacitively coupled with each other.

Figure 3:
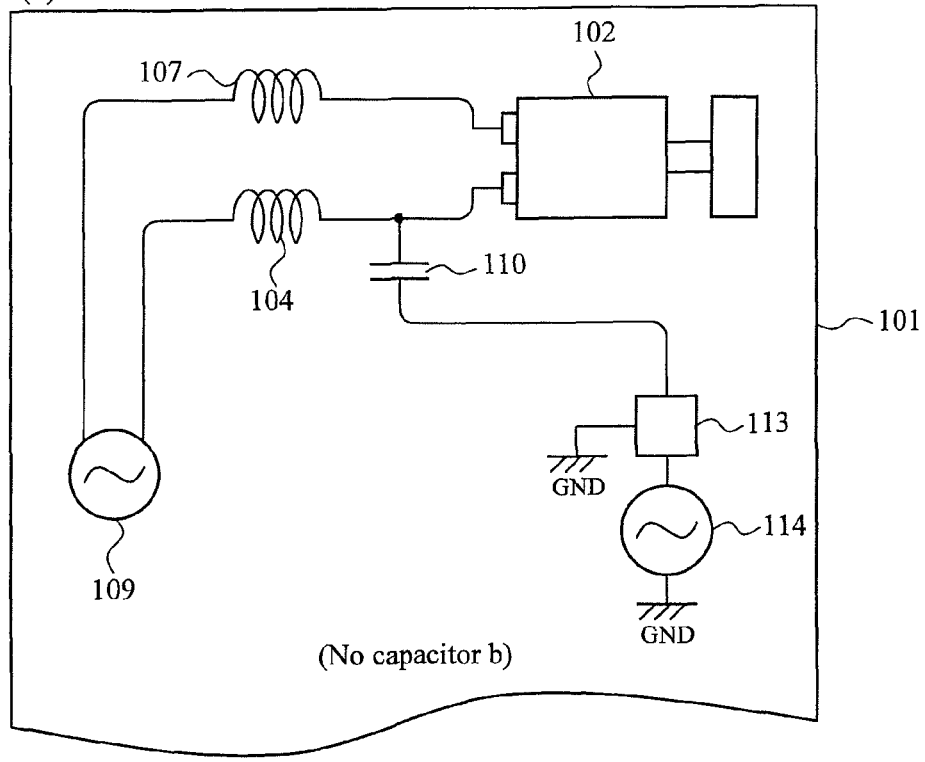
Figure 3:
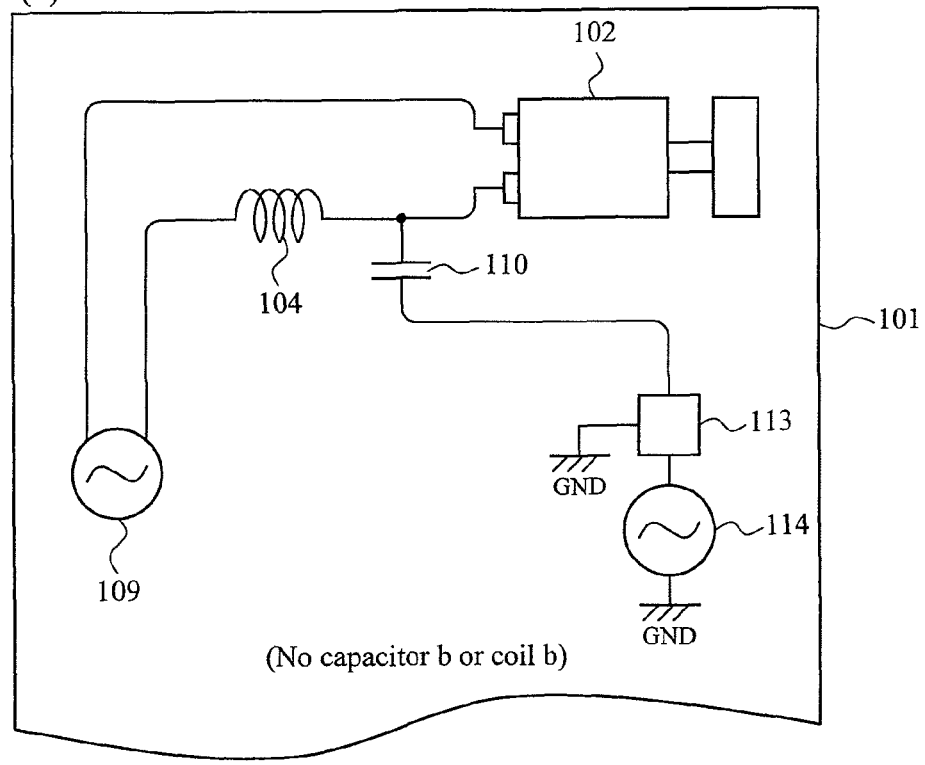

FIG. 3 is a diagram showing a part of a configuration example of a substrate of a modification of the first embodiment.

Figure 4A:
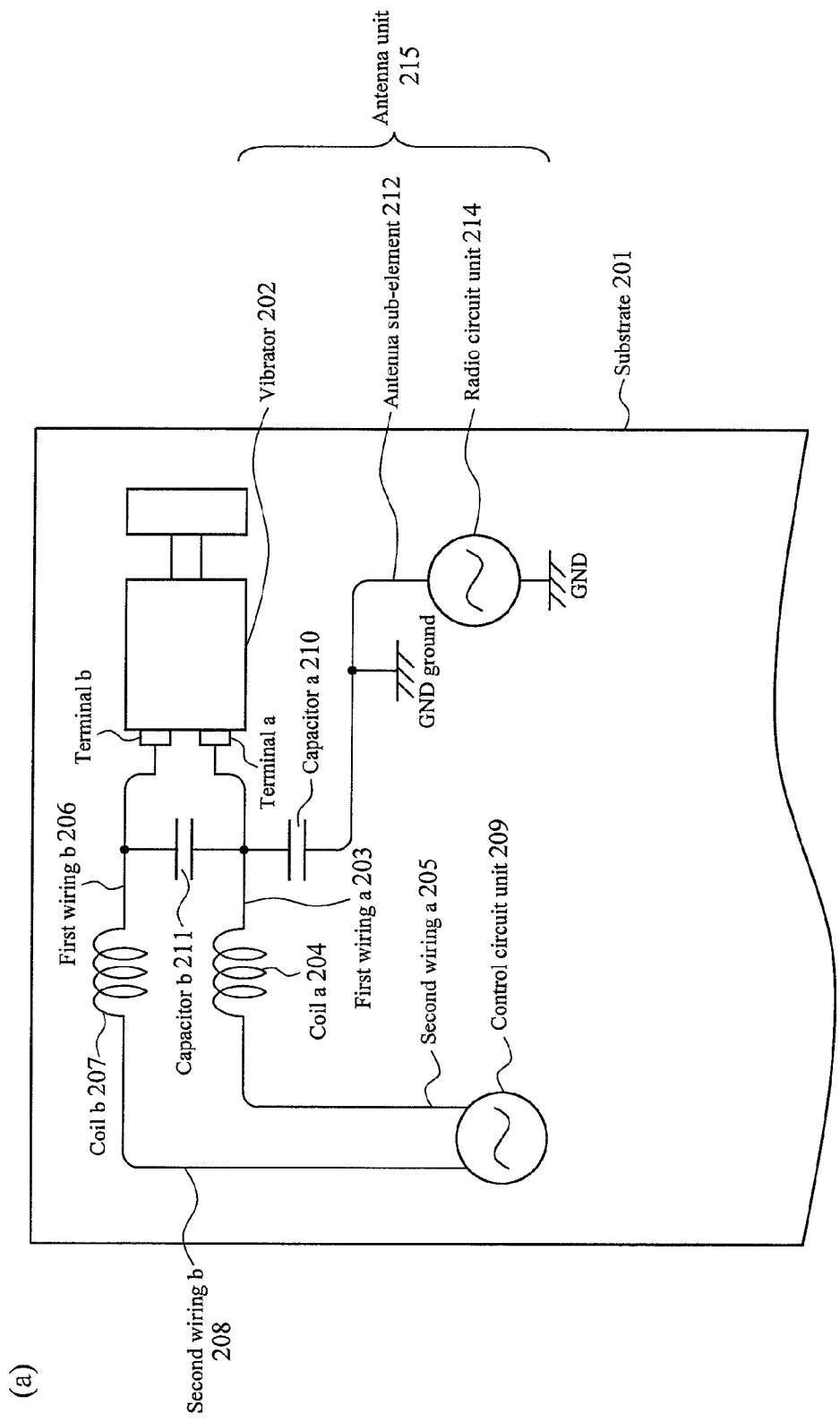

FIG. 4A is a diagram showing a configuration example of a mobile phone according to a second embodiment of the present invention.

Figure 4B:
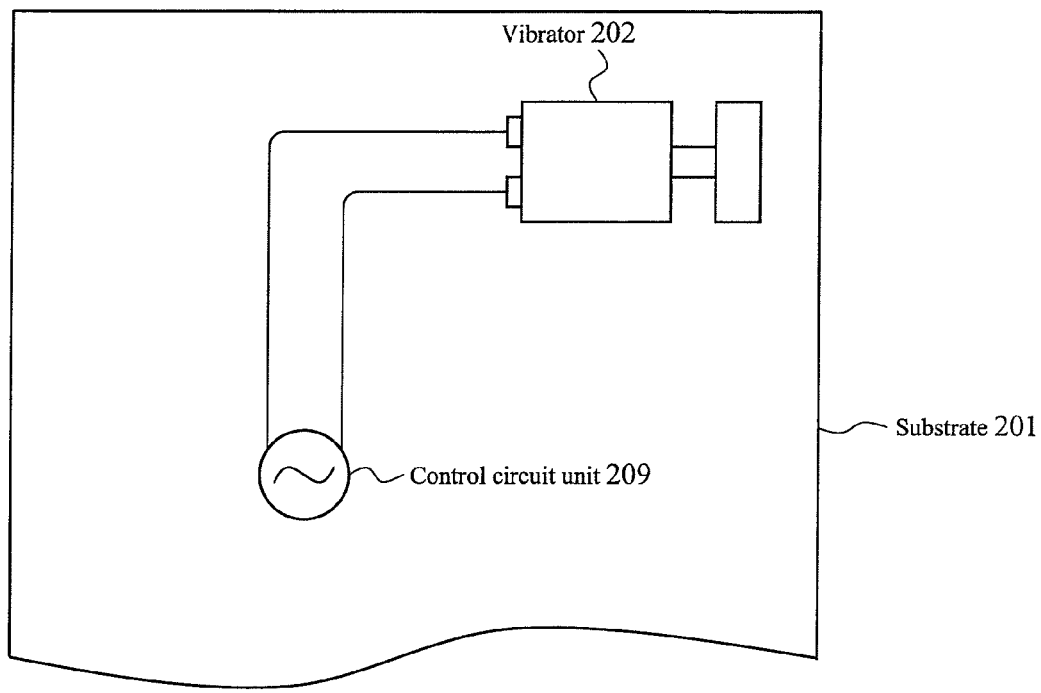
Figure 4B:
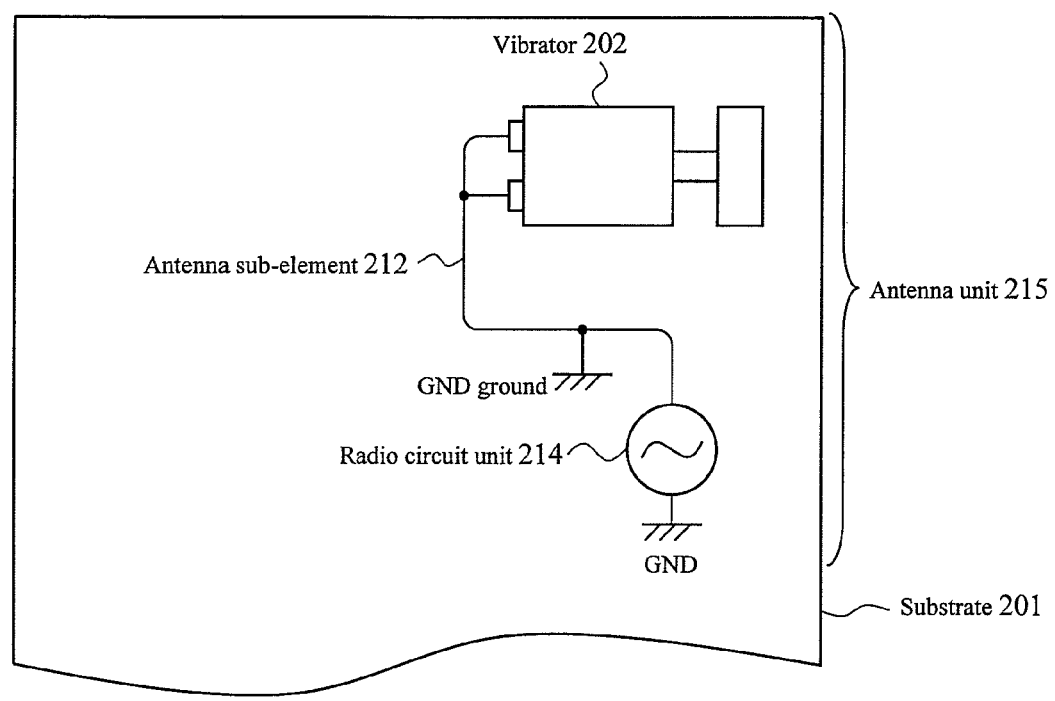

Part (b) in FIG. 4B is a diagram showing an equivalent circuit diagram, concerning the mobile phone in this embodiment, in a case where a vibrator which is an electronic component operates at the frequency $\lambda 1$. Part (c) in FIG. 4B is a diagram showing an equivalent circuit diagram in a case where an antenna unit operates at the frequency 22.

Figure 5A:
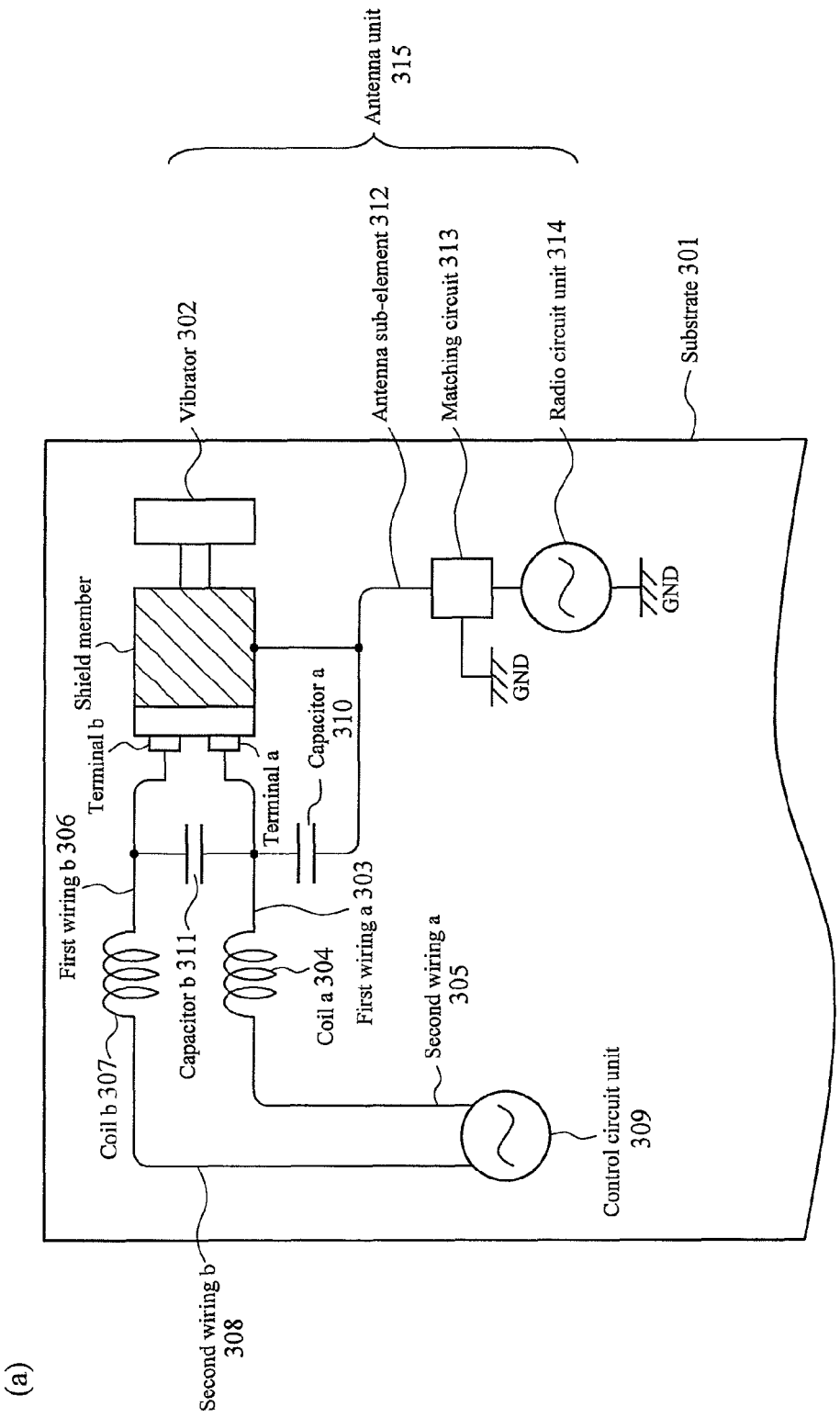

FIG. 5A is a diagram showing a configuration example of a mobile phone in a third embodiment of the present invention.

Figure 5B:
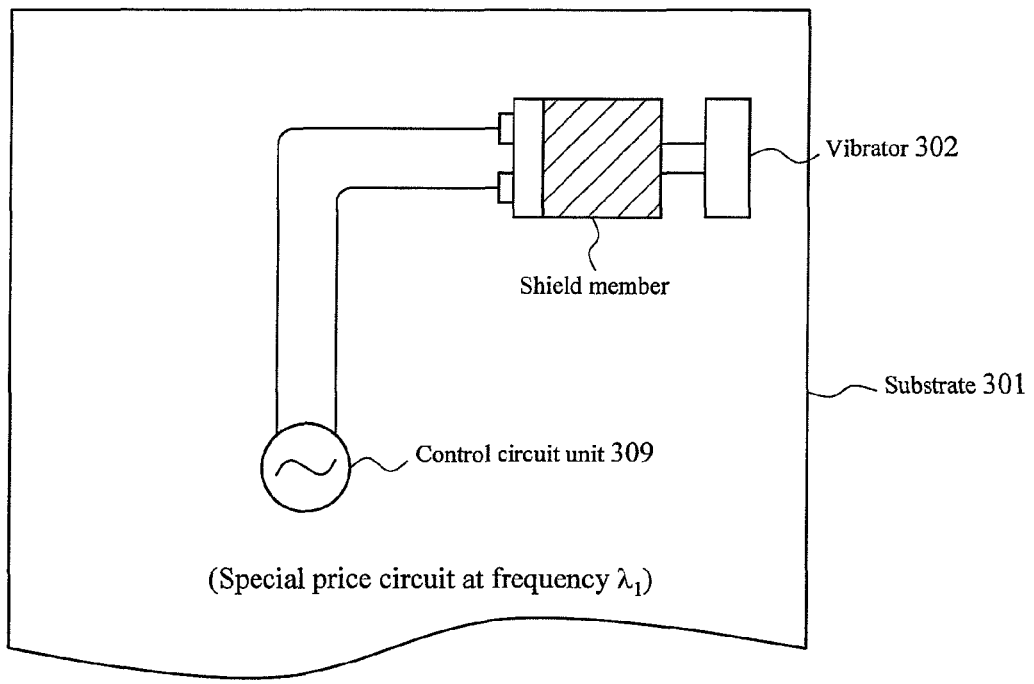
Figure 5B:
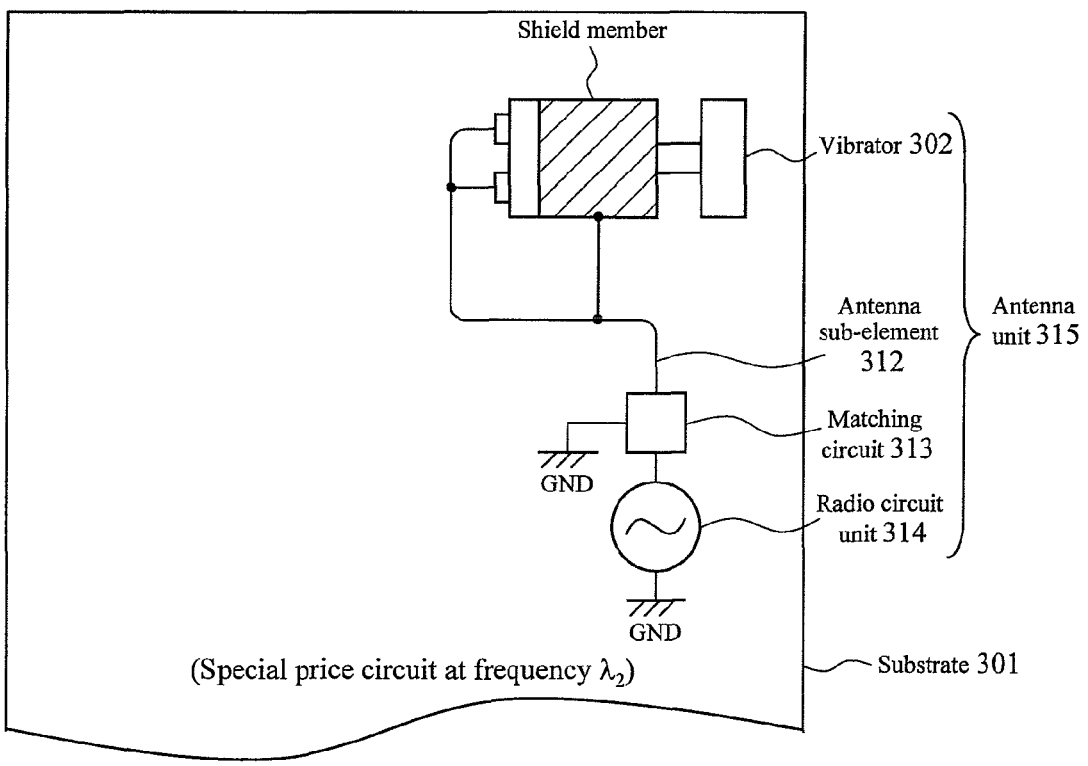

Part (b) in FIG. 5B is a diagram showing an equivalent circuit diagram, concerning the mobile phone in this embodiment, in a case where a vibrator operates at the frequency $\lambda 1$. Part (c) in FIG. 5B is a diagram showing an equivalent circuit in a case where an antenna unit operates at the frequency $\lambda 2$.

Figure 5C:
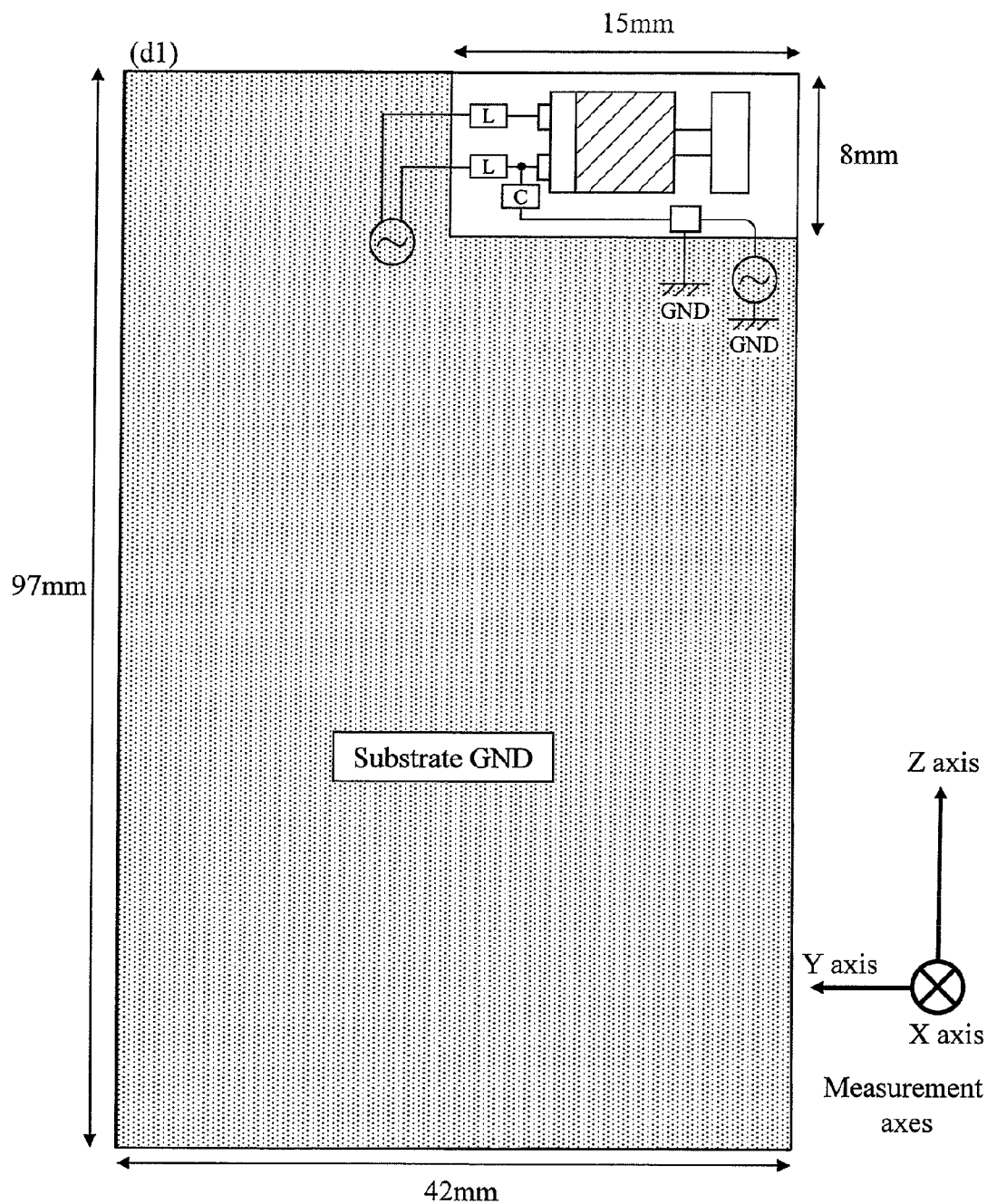

Part (d1) in FIG. 5C is a diagram showing a layout diagram of an evaluated substrate at the time of performing antenna feeding to only one terminal of the vibrator (Measurement Condition 1)).

Figure 5D:
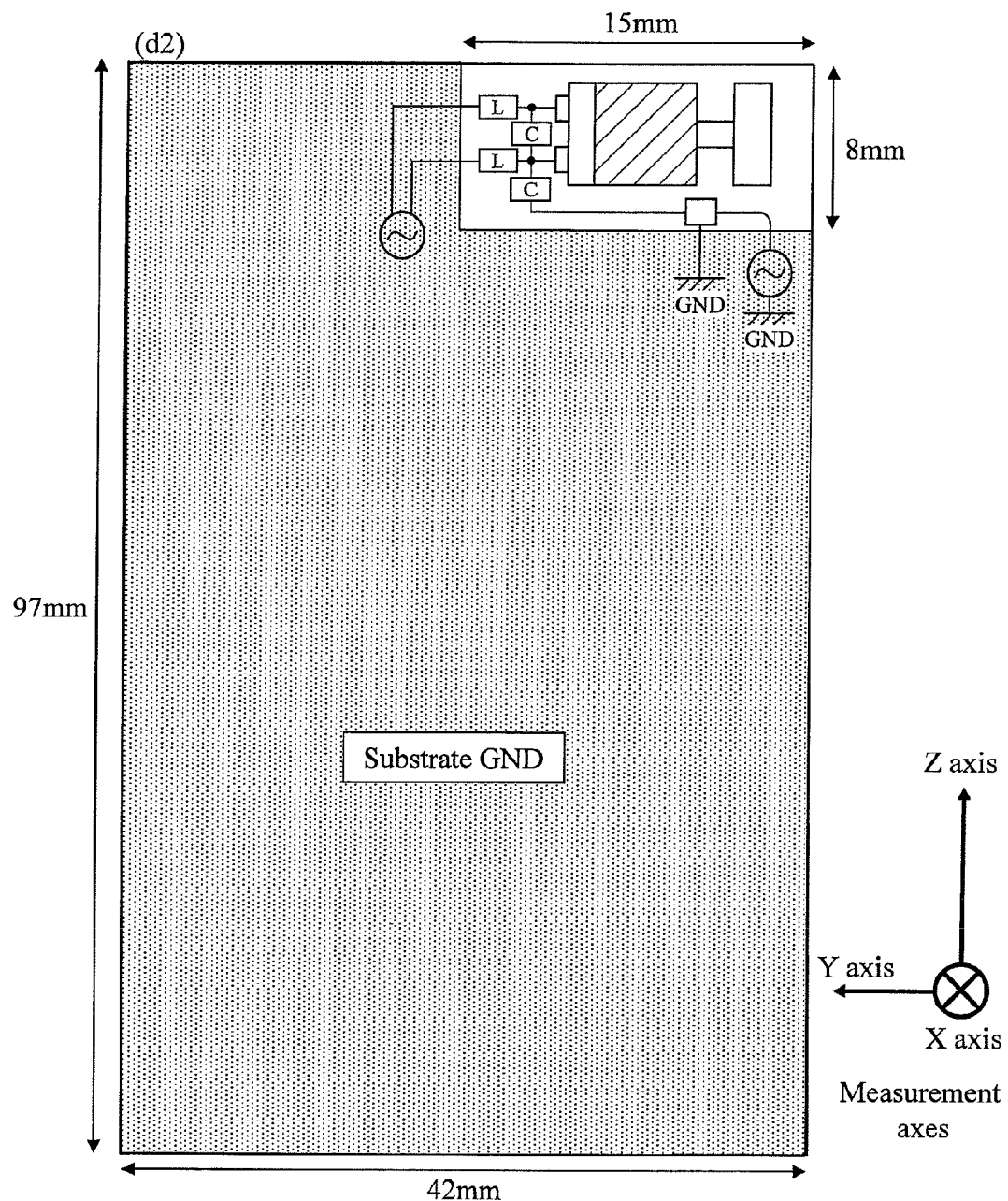

Part (d2) in FIG. 5D is a layout diagram of the evaluated substrate at the time of performing antenna feeding to two terminals of the vibrator (Measurement Condition 2)).

Figure 5E:
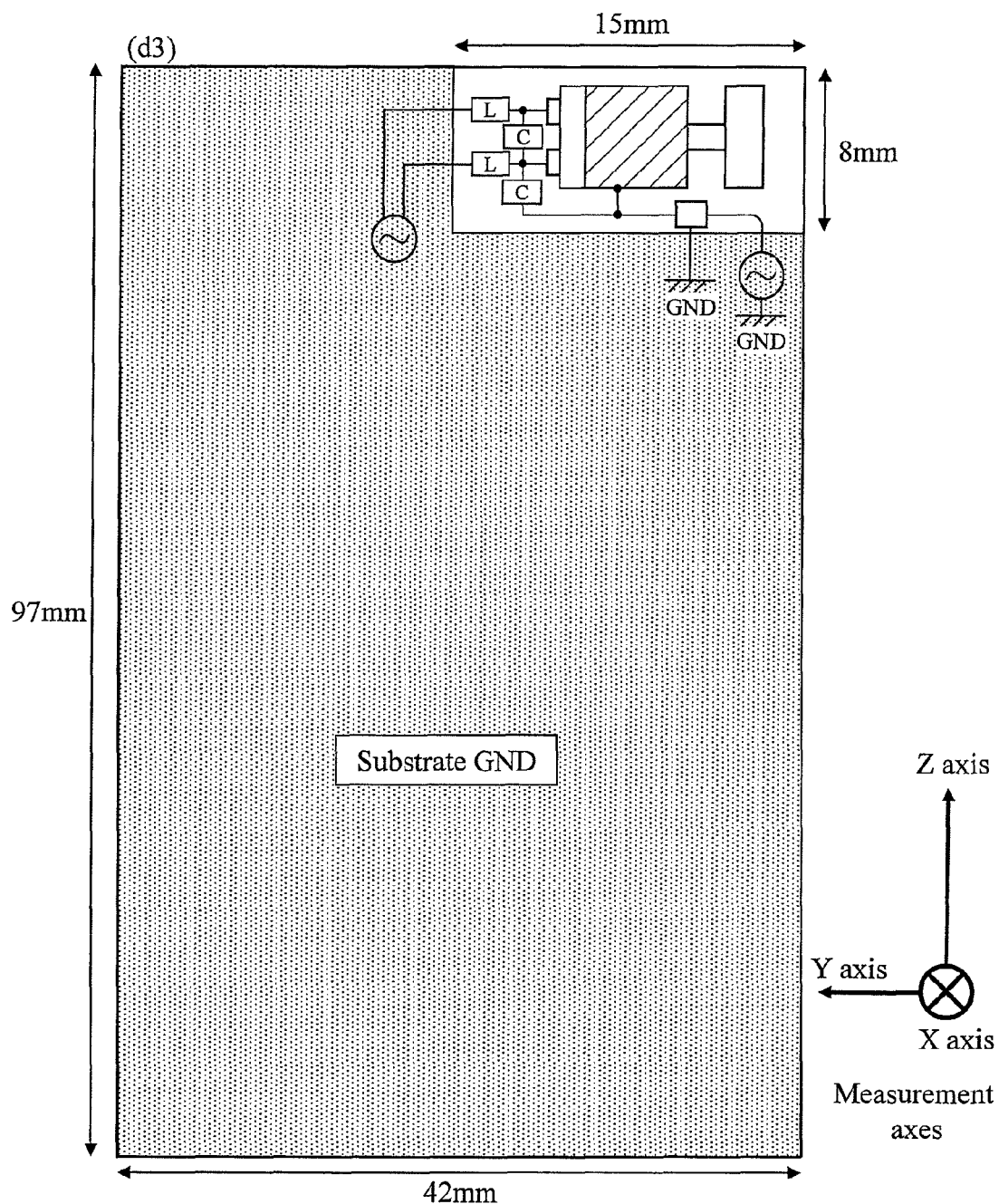

Part (d3) in FIG. 5E is a diagram showing a layout diagram of the evaluated substrate at the time of performing antenna feeding to the two terminals of the vibrator and to a reinforcing shield member of the vibrator (Measurement Condition 3)).

Figure 5F:
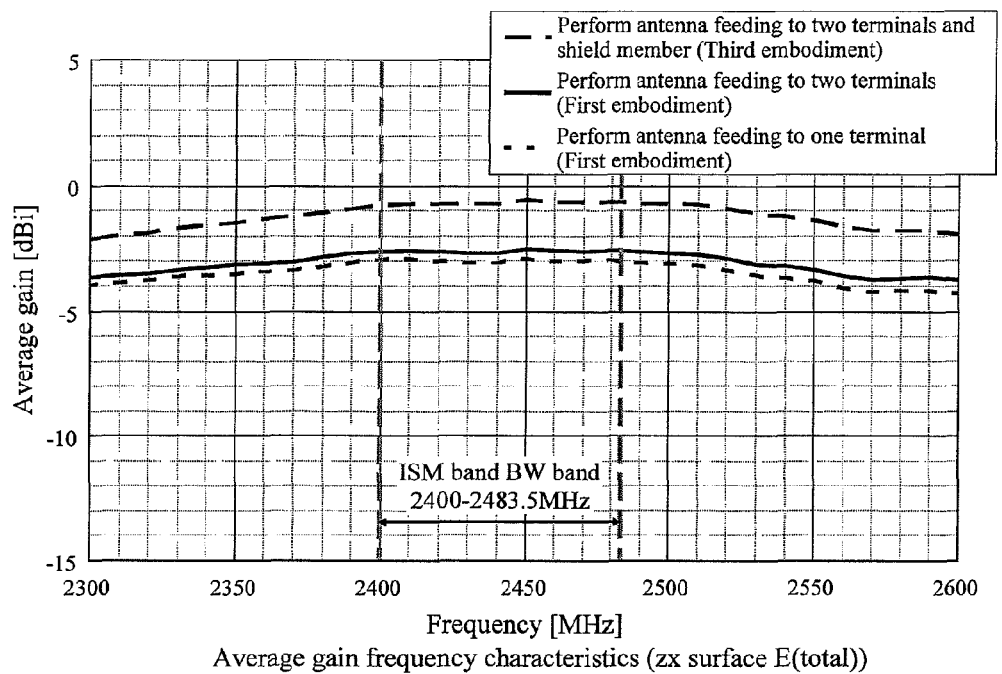
Figure 5F:
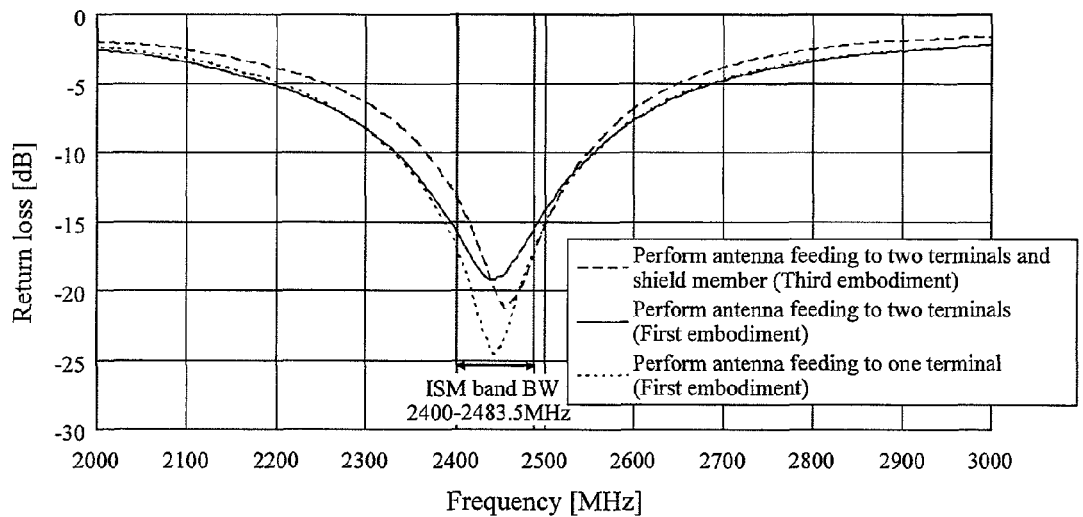

Part (e) in FIG. 5F is a graph showing average gain characteristics on ZX plane which are antenna characteristics under the respective measurement conditions. Part (f) in FIG. 5F is a graph showing return loss characteristics under the respective measurement conditions.

Figure 6A:
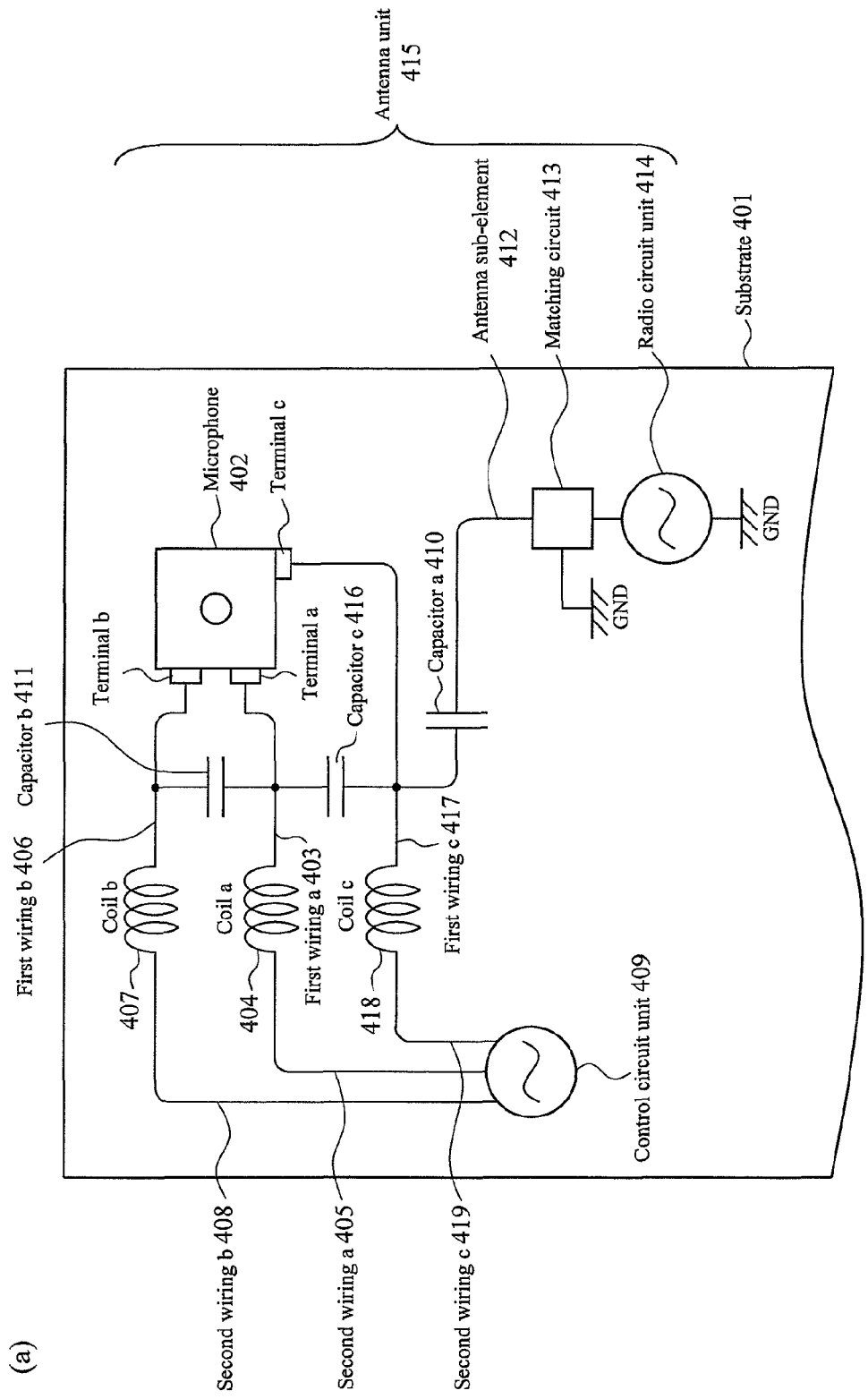

FIG. 6A is a diagram showing a configuration example of a mobile phone according to a fourth embodiment of the present invention.

Figure 6B:
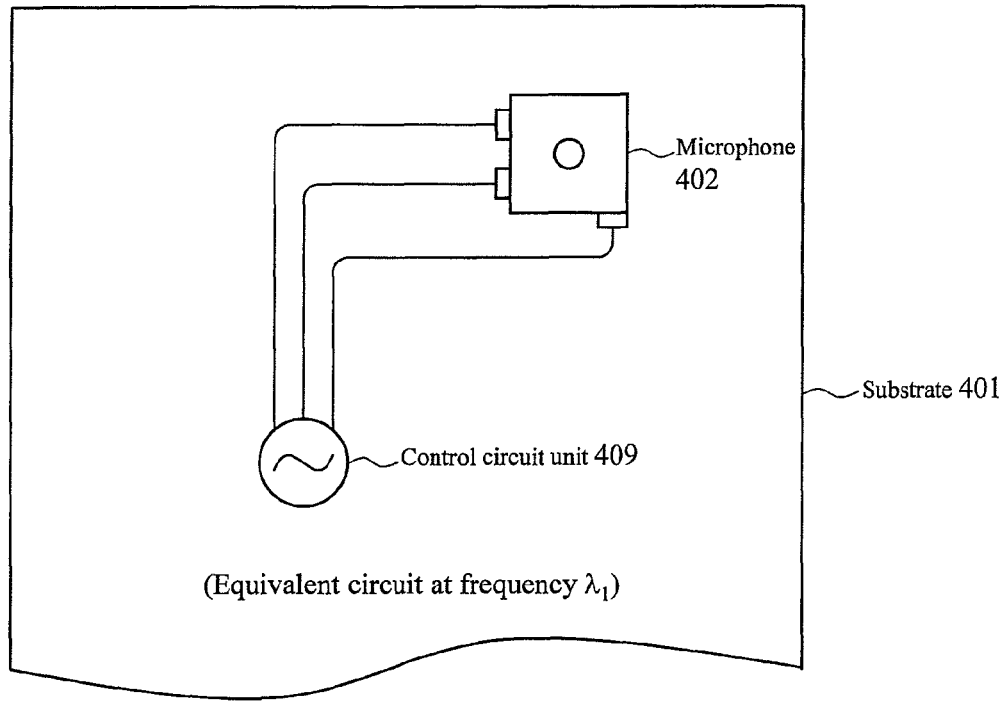
Figure 6B:
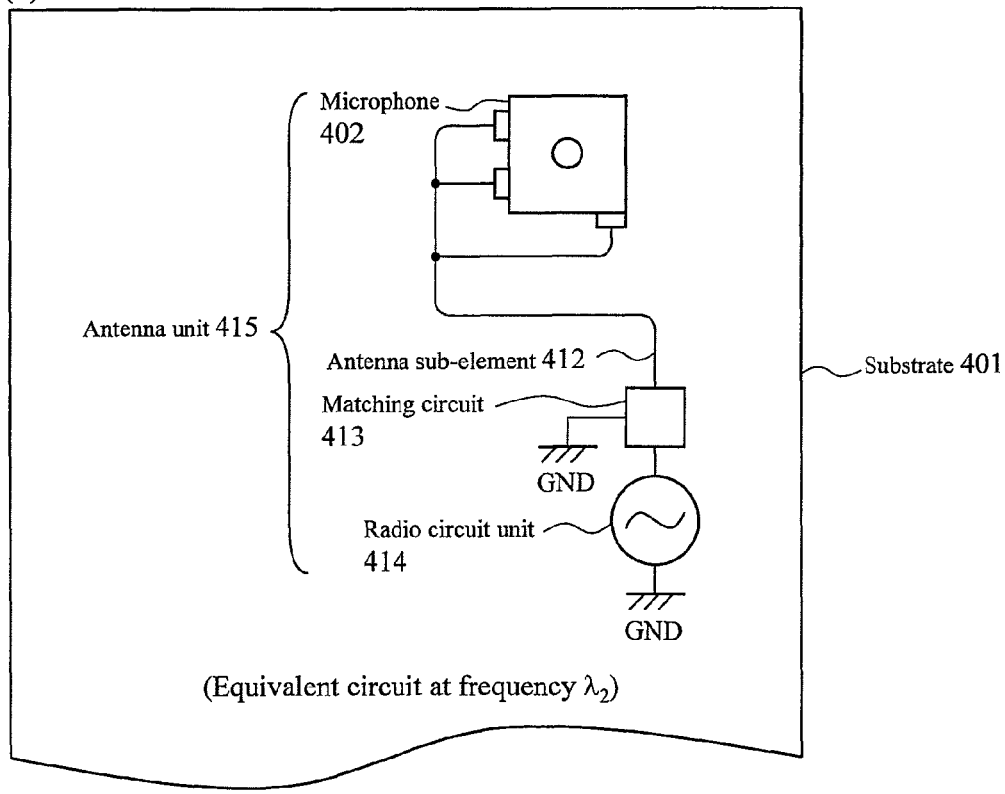

Part (b) in FIG. 6B is a diagram showing an equivalent circuit diagram, concerning the mobile phone according to this embodiment, in a case where a microphone 402 operates at the frequency $\lambda 1$. Part (c) in FIG. 6B is a diagram showing an equivalent circuit diagram, concerning the mobile phone according to this embodiment, in a case where an antenna unit 415 operates at the frequency $\lambda 2$.

Figure 7A:
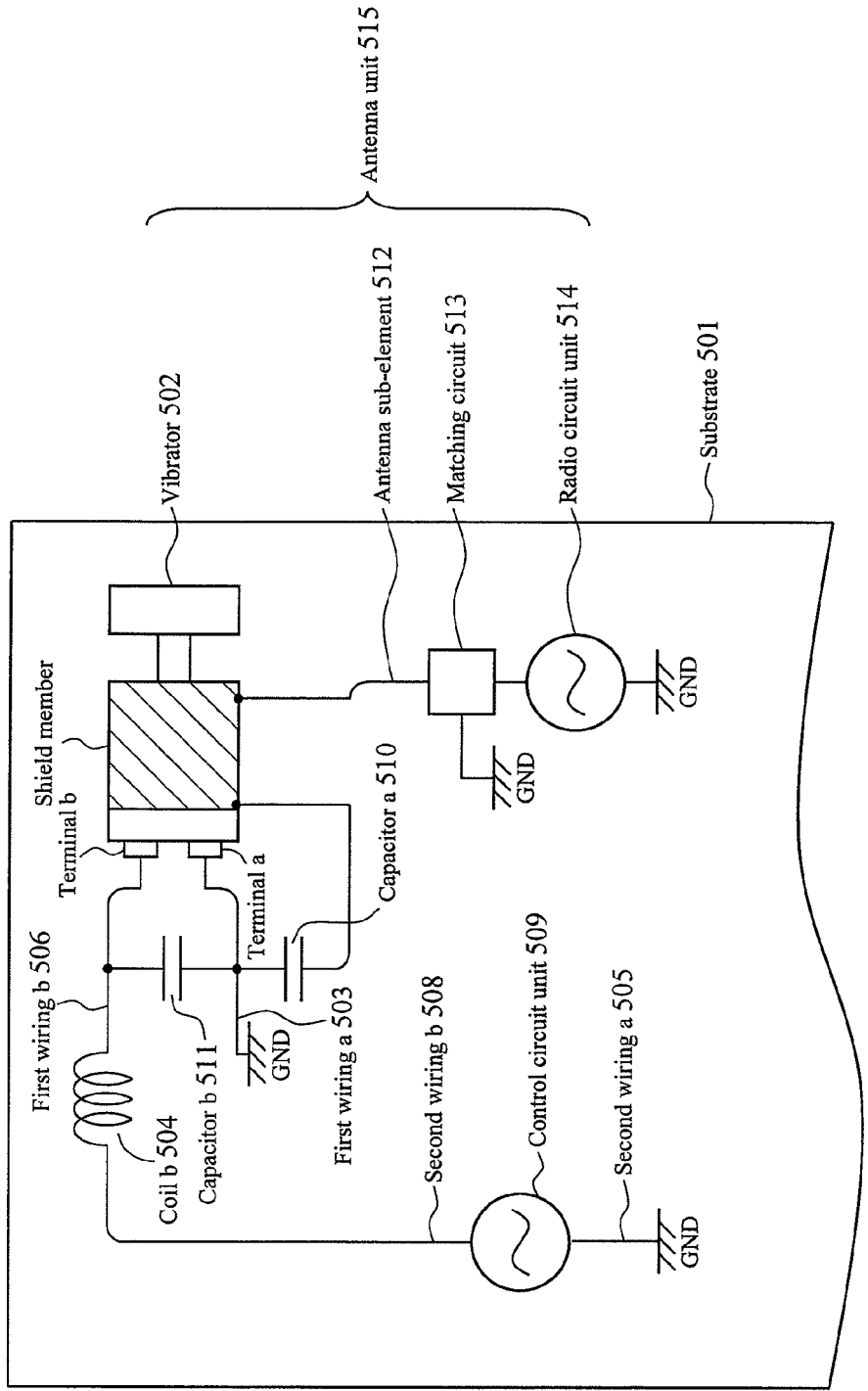

FIG. 7A is a diagram showing a part of a configuration example of a substrate according to a fifth embodiment of the present invention.

Figure 7B:
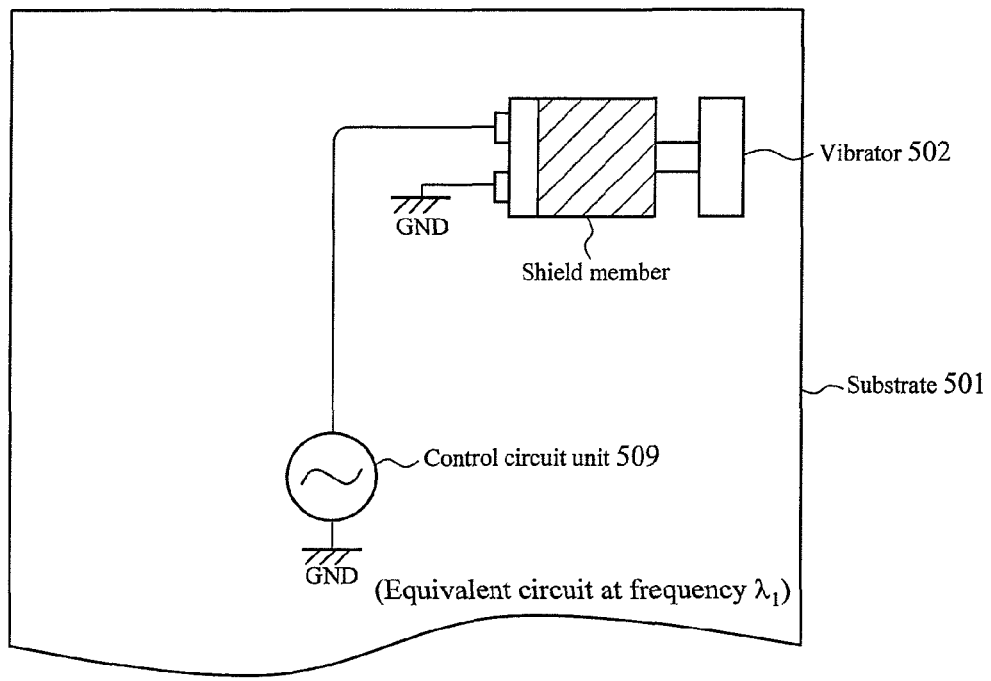
Figure 7B:
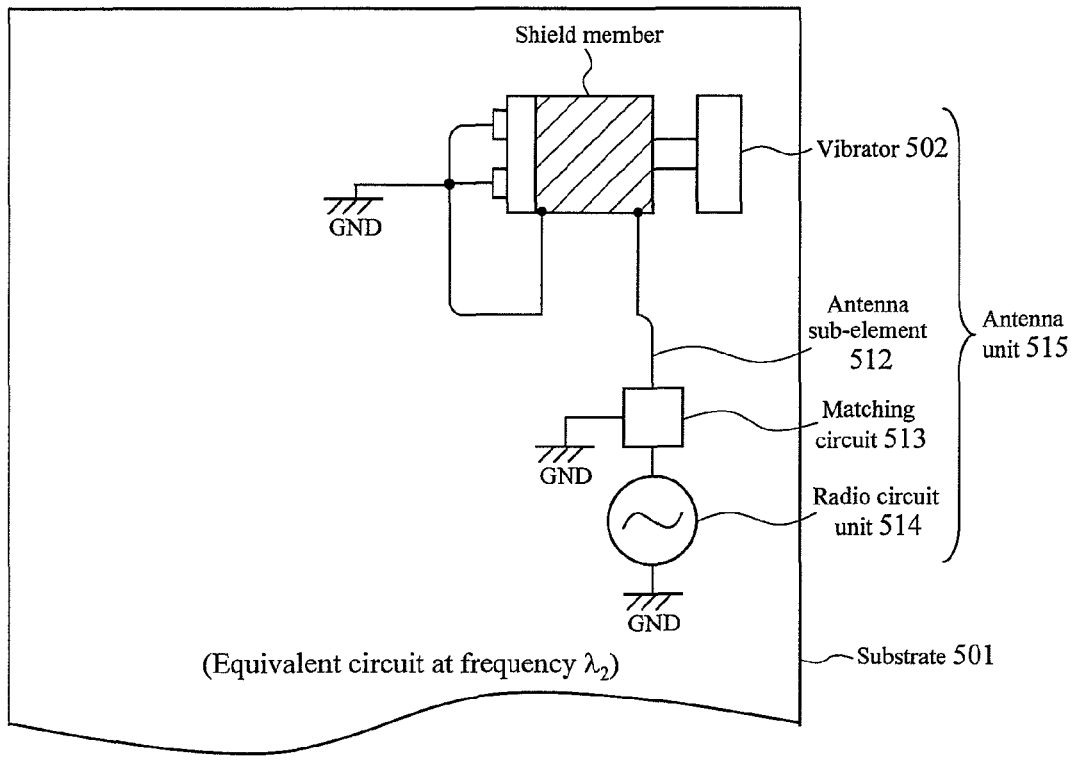

Part (b) in FIG. 7B is a diagram showing an equivalent circuit diagram, concerning the mobile phone according to this embodiment, in a case where a vibrator operates at the frequency $\lambda 1$. Part (c) in FIG. 7B is a diagram showing an equivalent circuit diagram, concerning the mobile phone according to this embodiment, in a case where an antenna unit operates at the frequency $\lambda 2$.

Figure 8A:
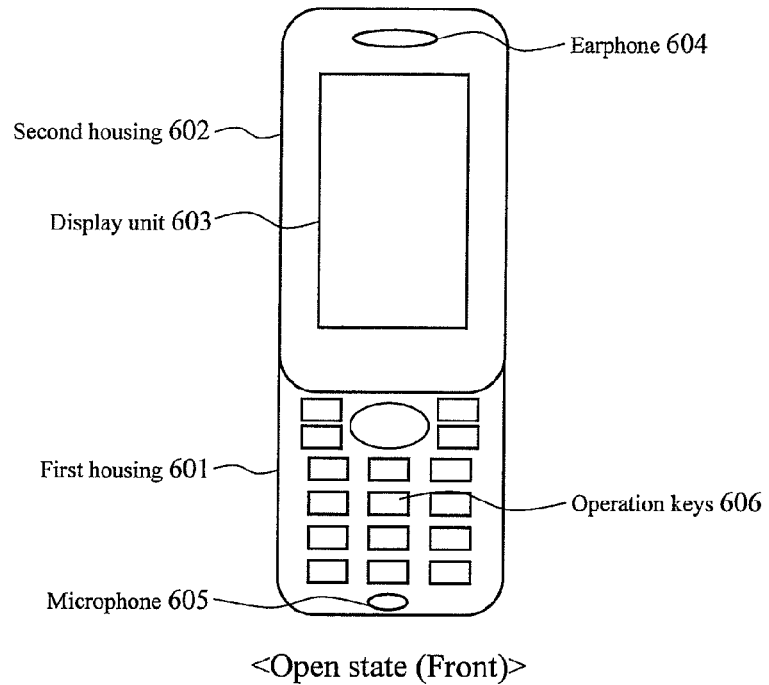
Figure 8A:
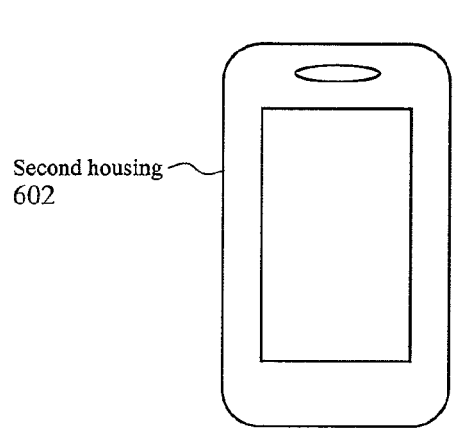
Figure 8A:
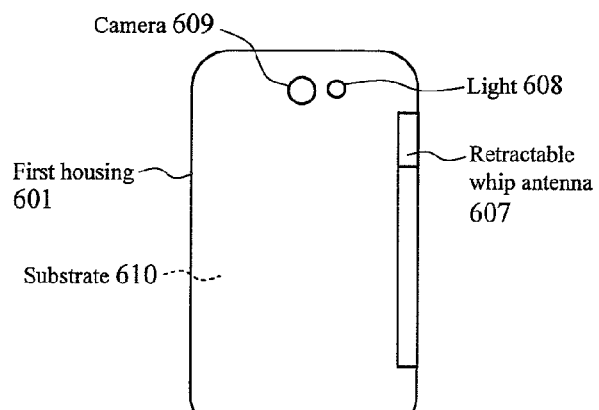

FIG. 8A is a diagram showing a part of configuration example of a substrate according to a sixth embodiment of the present invention. Part (a) in FIG. 8A is a diagram at the time when a slide type mobile phone is slid. Parts (b-1 and b-2) in FIG. 8A are diagrams showing a state in which the slide type mobile phone according to this embodiment is closed.

Figure 8B:
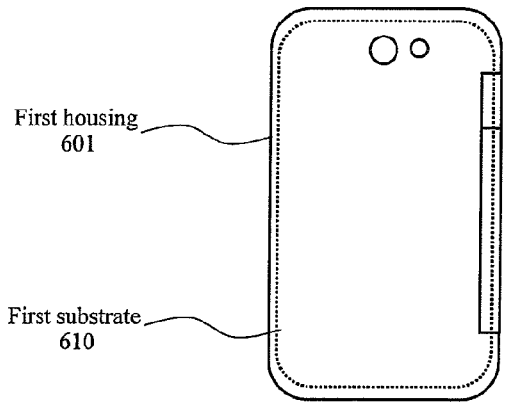
Figure 8B:
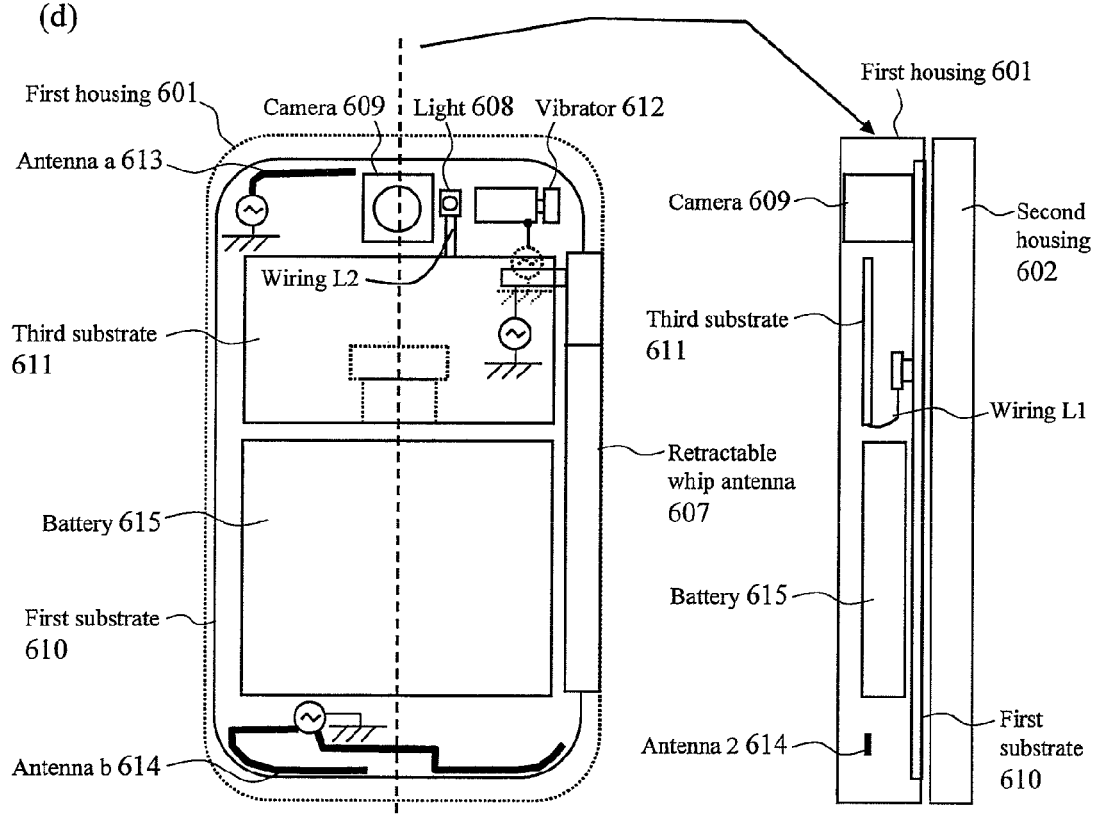

FIG. 8B is a diagram showing in detail a configuration example of a first substrate 610 in the slide type mobile phone according to this embodiment. Part (c) in FIG. 8B is a diagram showing a state in which the slide type mobile phone according to this embodiment is closed. Part (d) in FIG. 8B is a diagram showing in detail a configuration example of the first substrate.

Figure 9A:
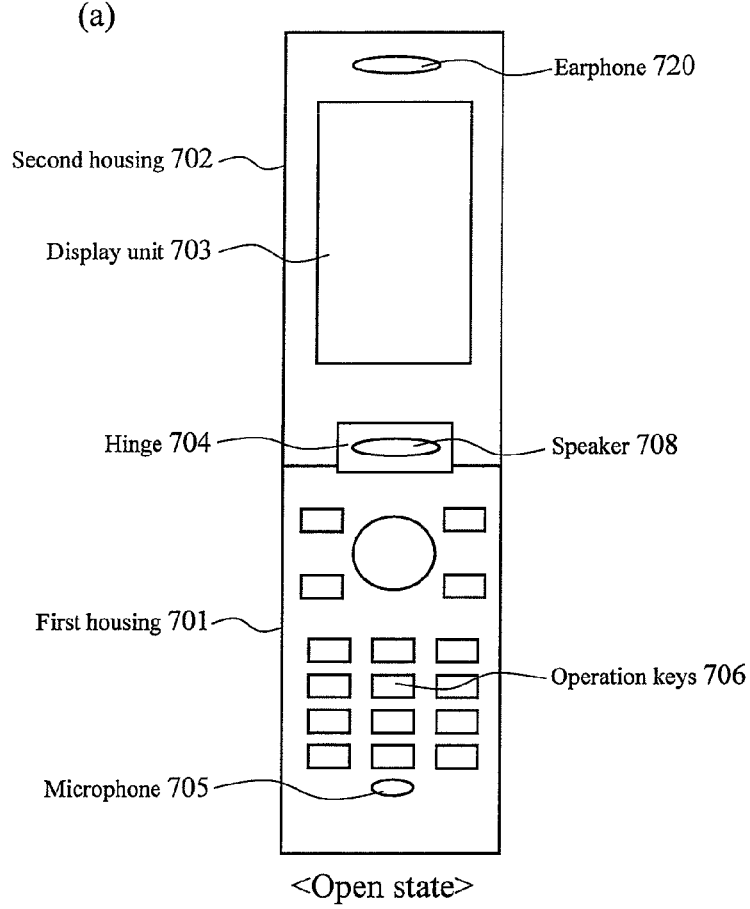
Figure 9A:
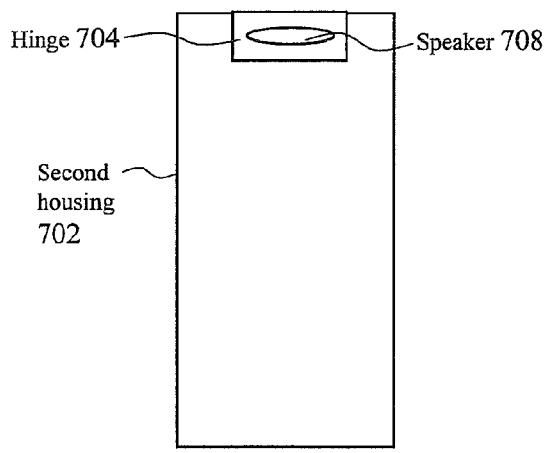
Figure 9A:
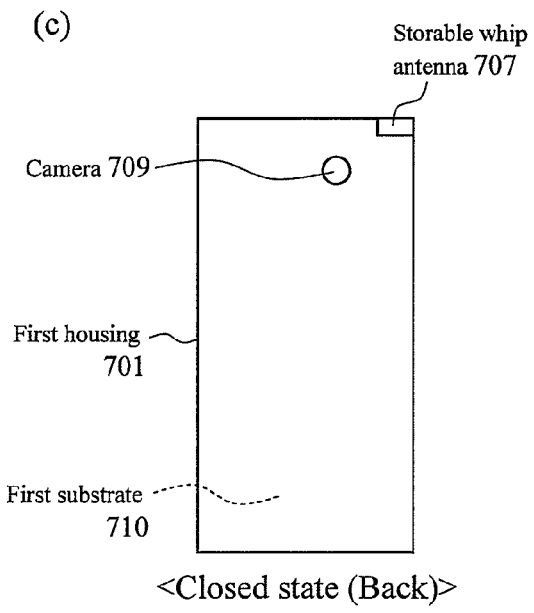

Part (a) in FIG. 9A is a diagram showing an external configuration example at the time when a clamshell-type mobile phone according to a seventh embodiment of the present invention is opened. Parts (b) and (c) in FIG. 9A are diagrams showing the external configuration example at the time when the clamshell-type mobile phone according to this embodiment is closed.

Figure 9B:
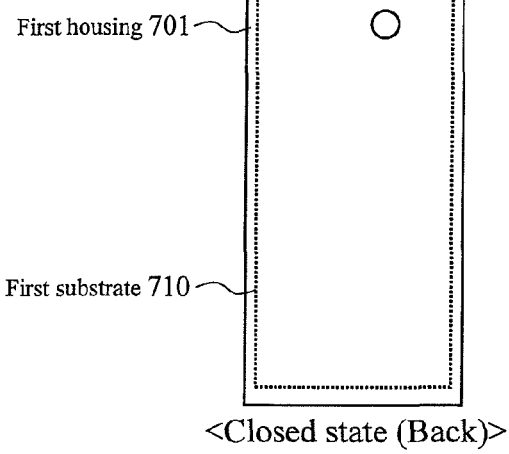
Figure 9B:
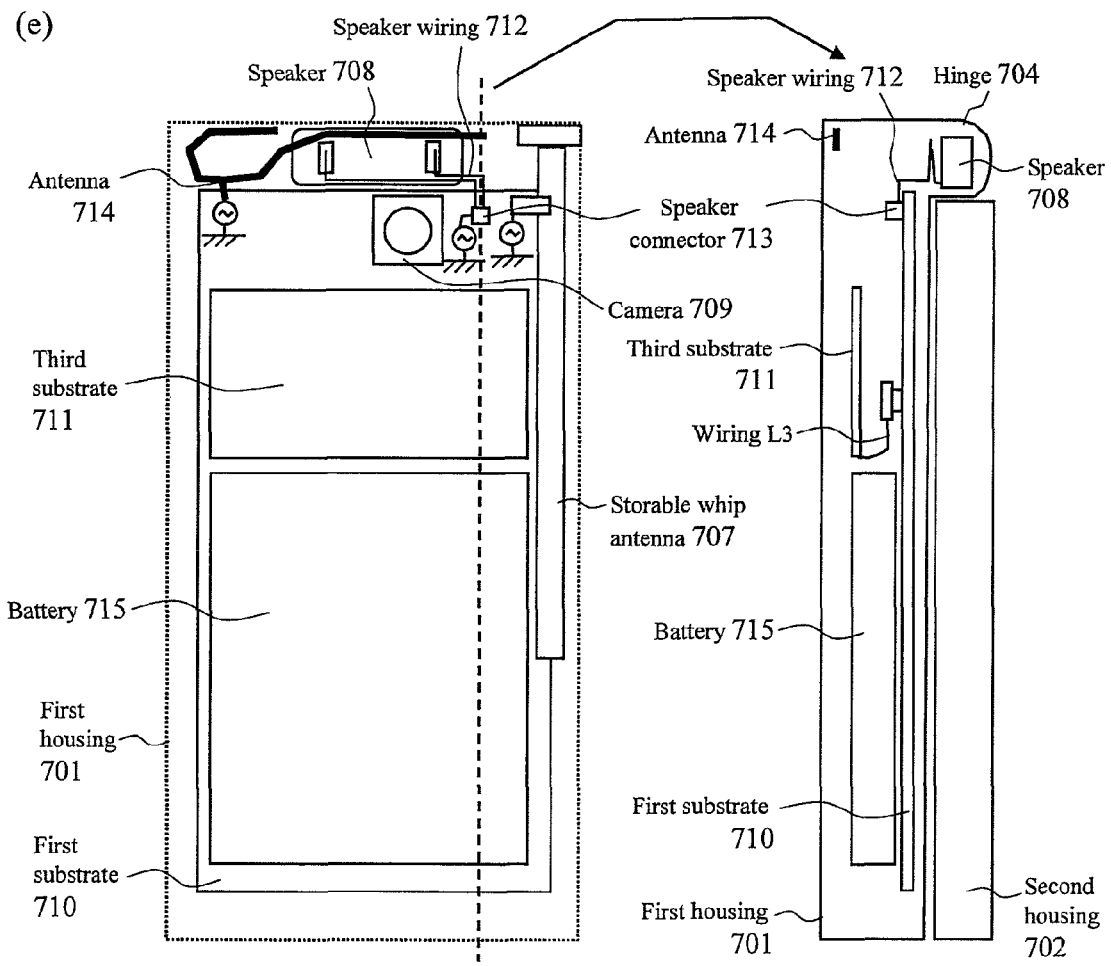

Part (d) in FIG. 9B is a diagram showing a back surface of the mobile phone in the closed state. Part (e) in FIG. 9 shows diagrams of a detailed configuration of a first substrate of the clamshell-type mobile phone according to this embodiment. A detailed plan diagram and a cross-sectional diagram of the first substrate are shown in Part (e) in FIG. 9.

Figure 9C:
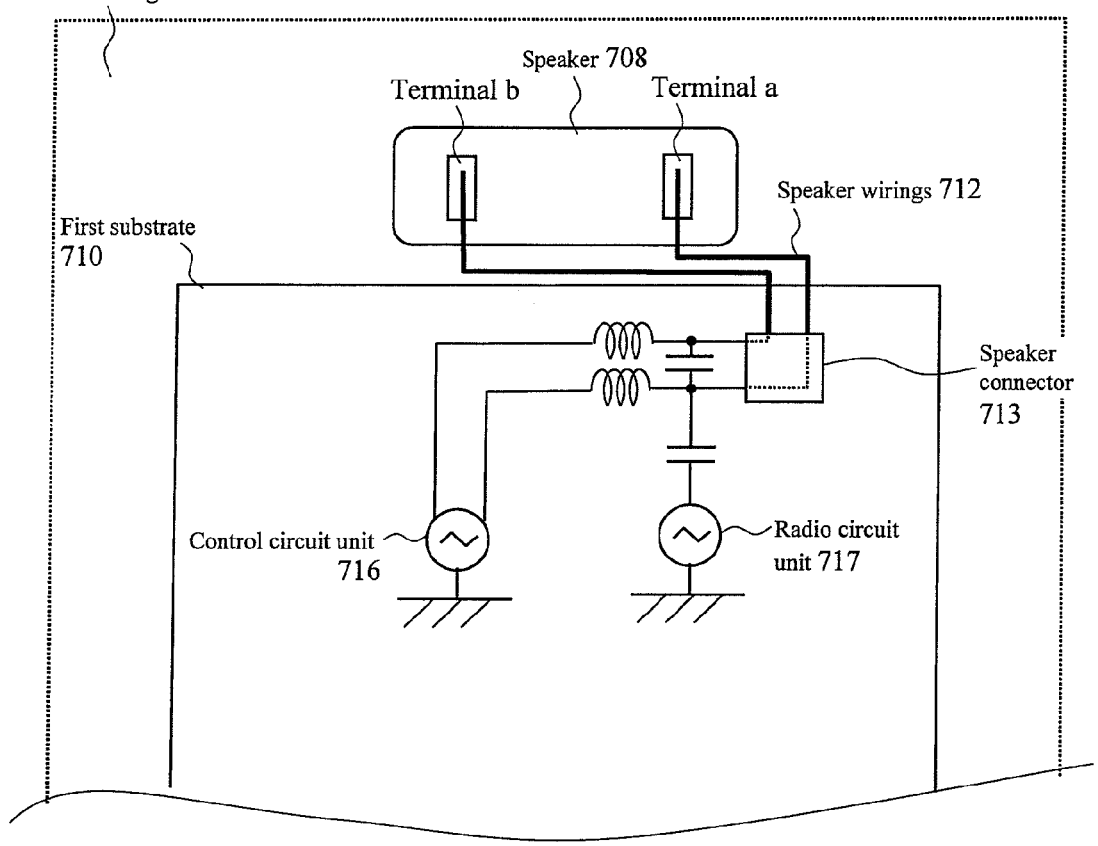

Part (f) in FIG. 9C is a diagram showing a detailed configuration example in which a speaker is arranged in a hinge in the clamshell-type mobile phone according to this embodiment.

Figure 10A:
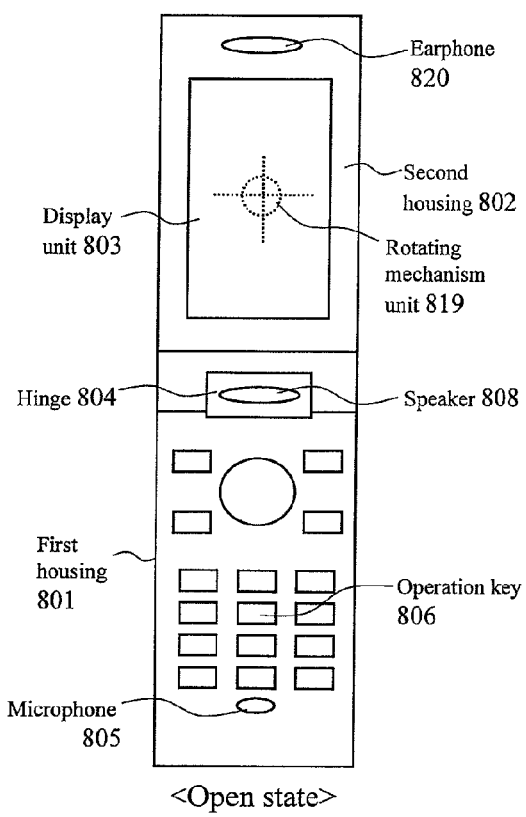
Figure 10A:
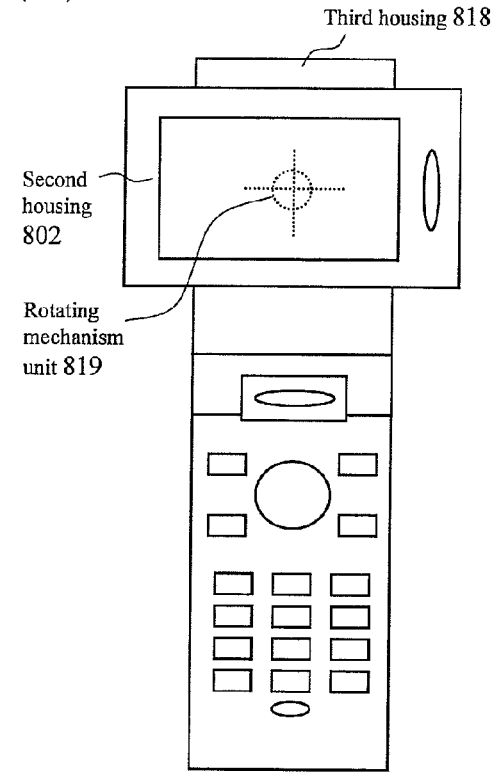
Figure 10A:
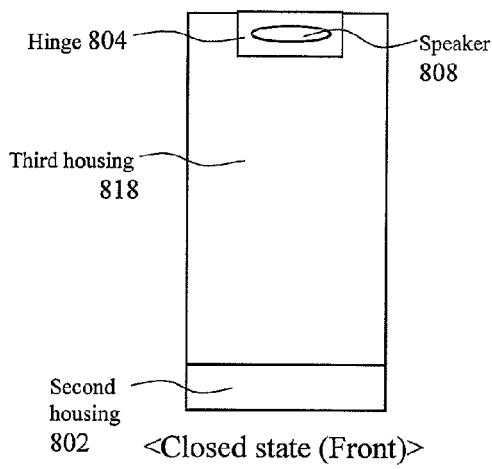
Figure 10A:
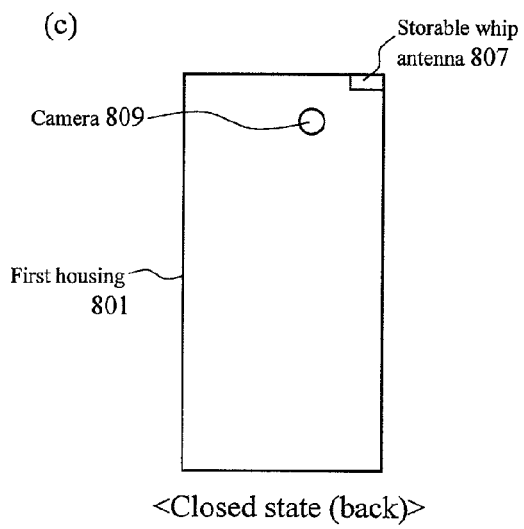

Parts (a-1) and (a-2) in FIG. 10A are diagrams showing an external configuration example at the time when a mobile phone according to this embodiment is opened. Parts (b) and (c) in FIG. 10A are diagrams showing the external configuration example at the time when the mobile phone according to this embodiment is closed.

Figure 10B:
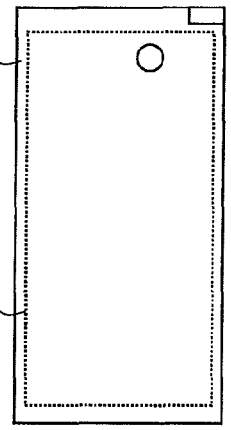
Figure 10B:
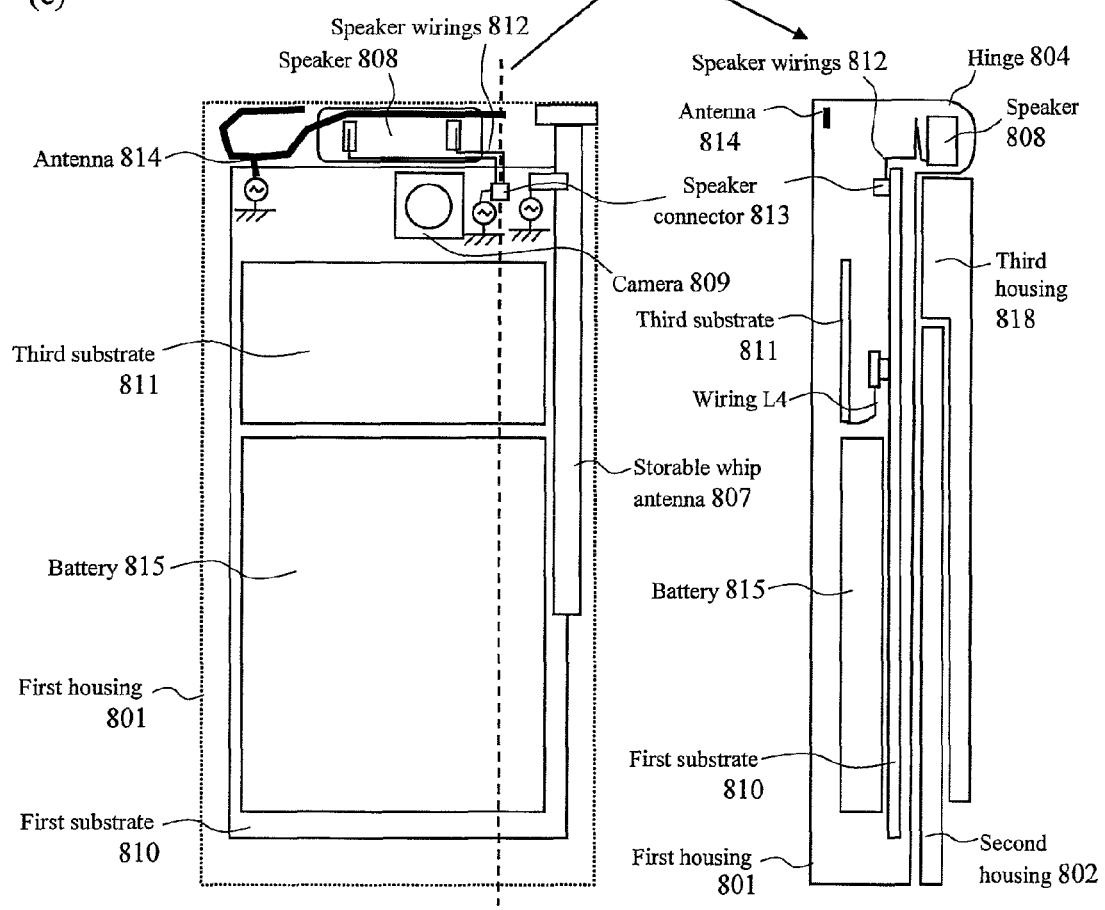

Part (d) in FIG. 10B is a diagram showing a back of the mobile phone in the closed state. Part (e) in FIG. 10B shows diagrams of a detailed configuration of a first substrate of the mobile phone according to this embodiment.

Figure 11A:
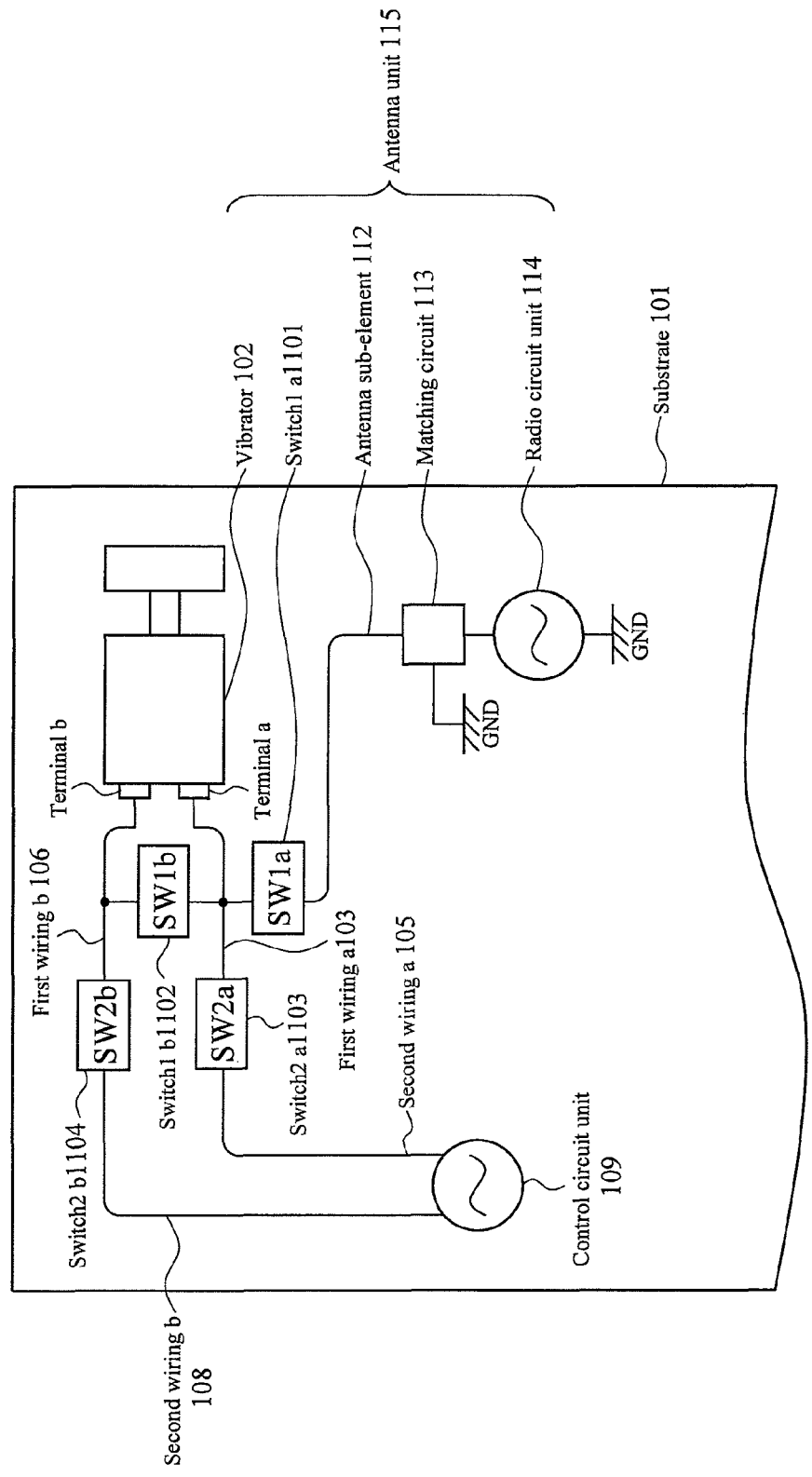

Part (a) in FIG. 11A is a diagram showing a configuration example of a mobile phone according to a ninth embodiment of the present invention.

Figure 11B:
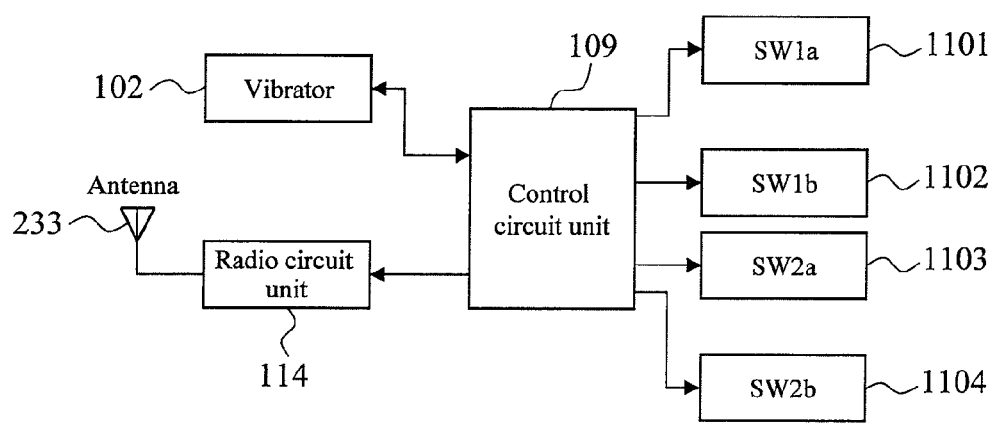

Part (b) in FIG. 11B is a block diagram related to control over switches of this embodiment.

Figure 11C:
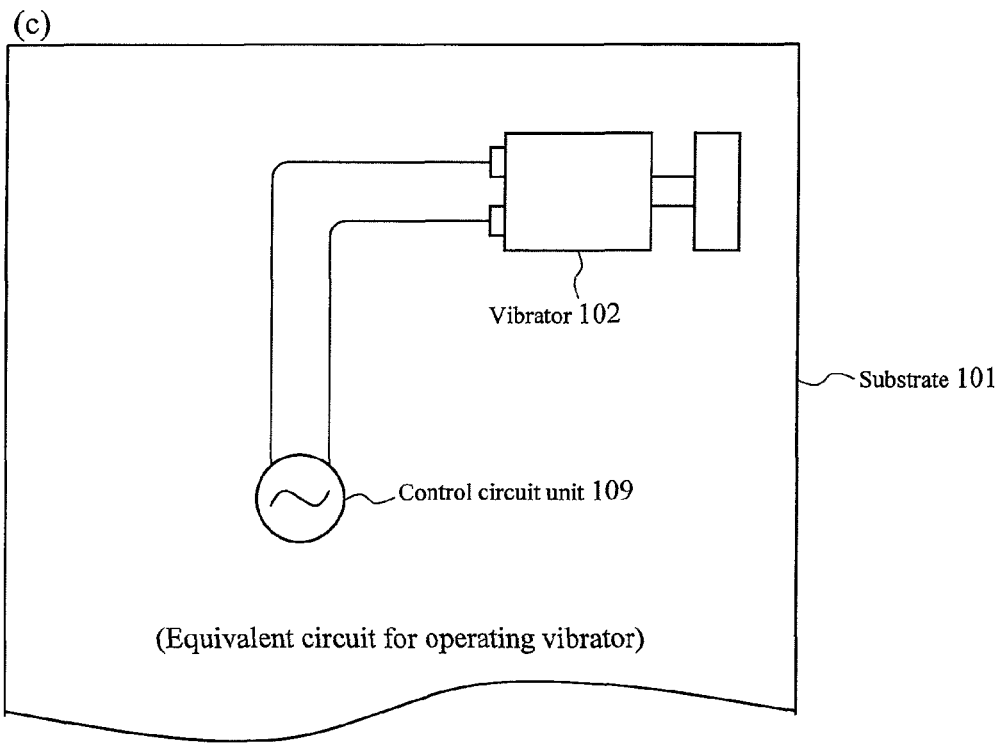
Figure 11C:
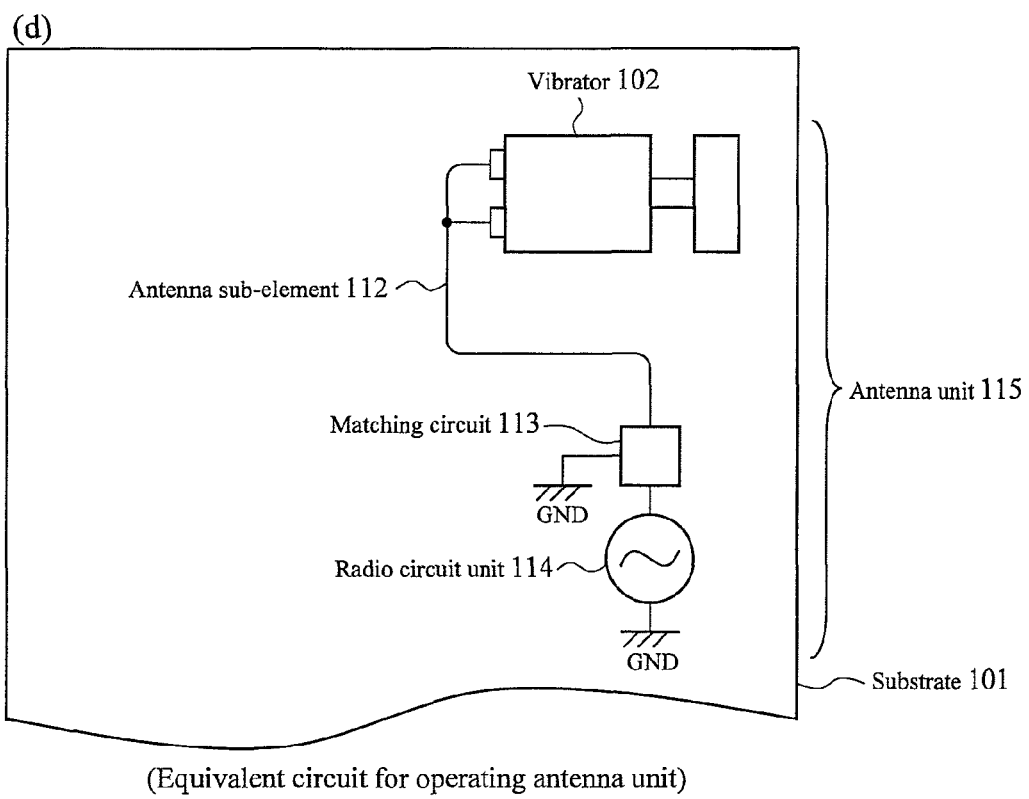

Part (c) in FIG. 11C is an equivalent circuit in a case where a vibrator is operated. Part (d) in FIG. 11C is an equivalent circuit in a case where an antenna unit is operated.

Figure 12A:
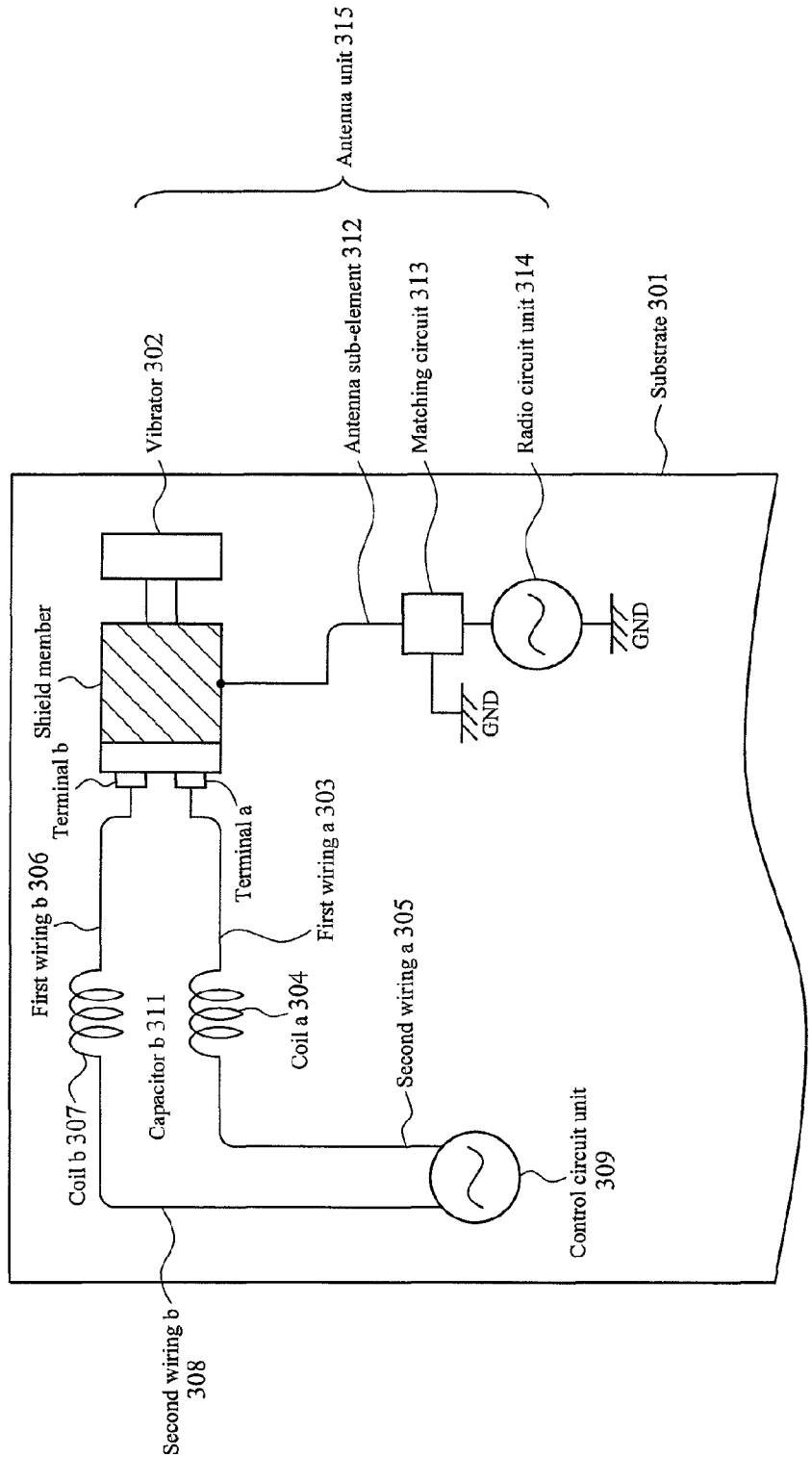

Part (a) in FIG. 12A is a diagram showing a circuit configuration of a mobile phone according to a tenth embodiment of the present invention.

Figure 12B:
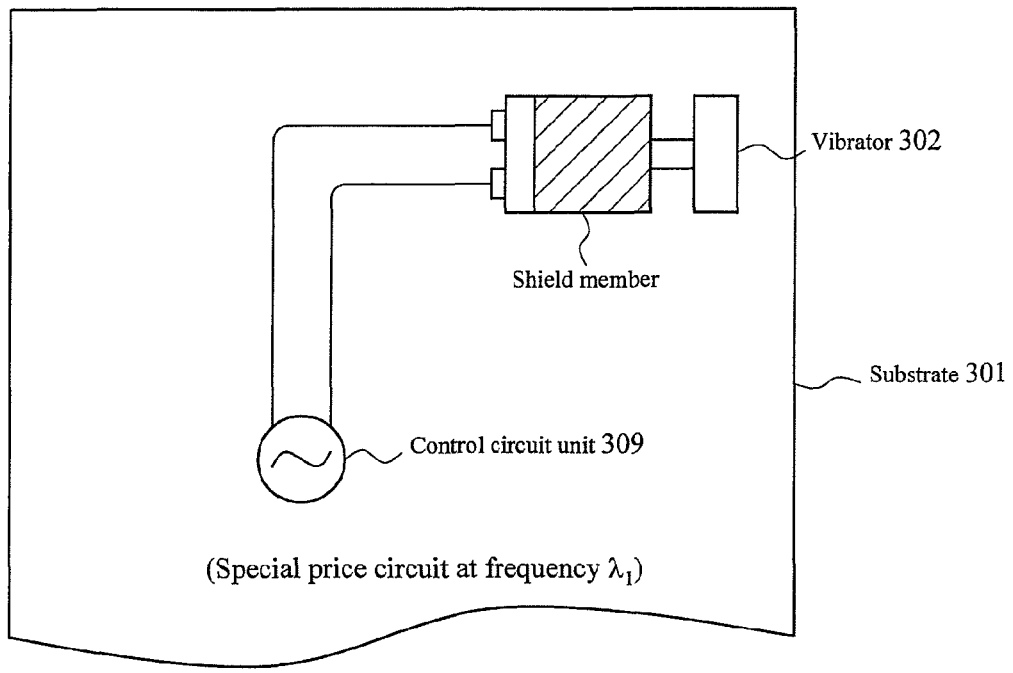
Figure 12B:
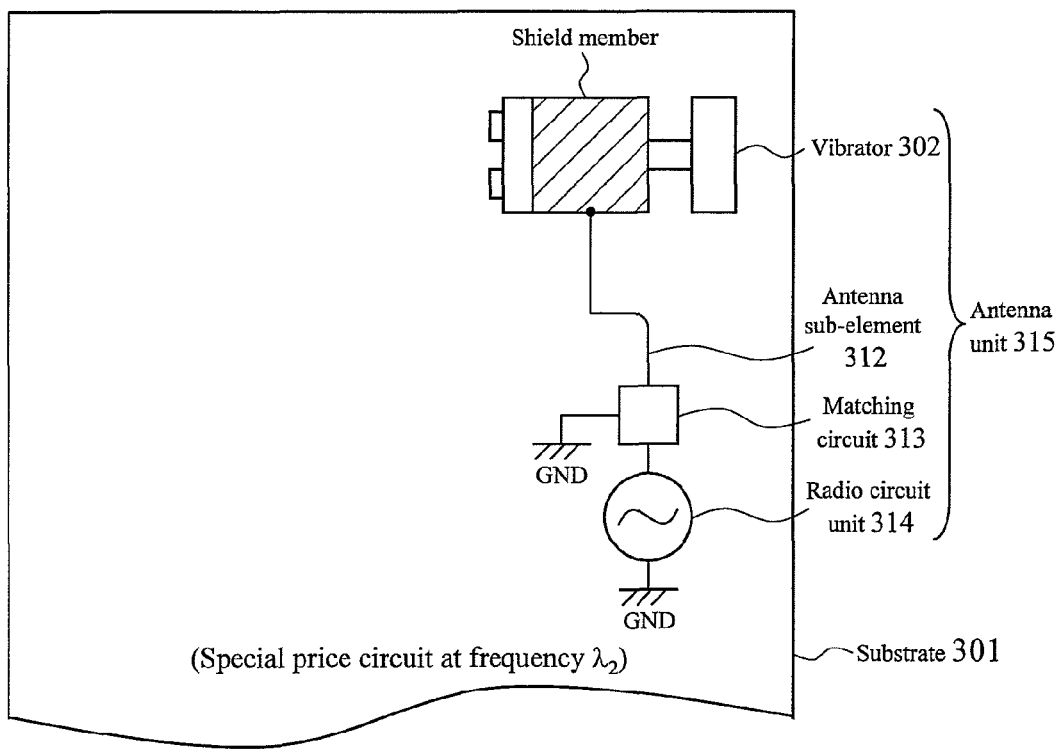

Part (b) in FIG. 12B is a diagram showing an equivalent circuit diagram, concerning the mobile phone according to this embodiment, in a case where a vibrator operates at the frequency λ1. Part (c) in FIG. 12B is a diagram showing an equivalent circuit diagram, concerning the mobile phone according to this embodiment, in a case where an antenna unit operates at the frequency λ2.

Figure 12C:
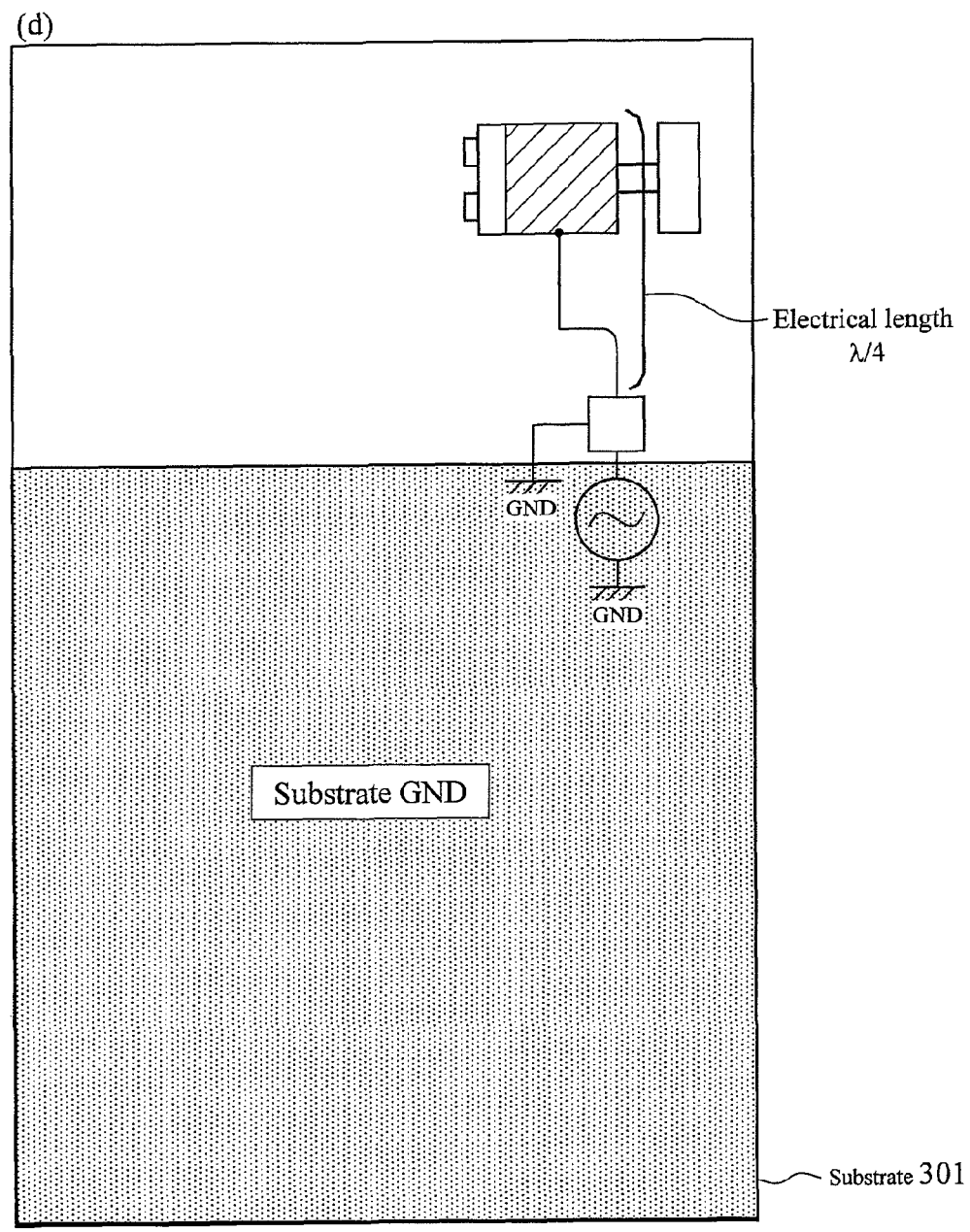

Part (d) in FIG. 12C is a diagram showing a configuration example with a ground of a substrate taken into consideration as well.

DESCRIPTION OF SYMBOLS 10 mobile phone
102 vibrator
109 control circuit unit
114 radio circuit unit
222 key operation unit
232 storage memory
233 antenna
234 light
235 display unit
236 speaker
402 microphone

BEST MODES FOR CARRYING OUT THE INVENTION

In this specification, an electronic component is (1) preferably connected to a control circuit unit which controls the electronic component and the control circuit unit does not use an RF signal (radio signal) as a control signal therefor. If the control signal is an RF signal, the control circuit unit causes the electronic component to operate as an antenna. At this time, if the electronic component is utilized as the antenna by connecting a terminal thereof to a radio circuit unit, there arises a problem that isolation between the electronic component and the antenna is difficult to secure. In addition, when the control circuit unit and the radio circuit unit are operated at the same time, a problem of a cross modulation occurs. Thus, the control signal should not be an RF signal.

In addition, (2) it is more preferable that the level of a harmonic noise at an operating frequency of the electronic component be low. This is because when the control circuit unit and the radio circuit unit are operated at the same time, the harmonic noise in the electronic component at an operating frequency of a control signal therefor degrades receiving sensitivity of the antenna. Thus, the level of the harmonic noise in the electronic component should be low.

(3) In addition, it is preferable that the operating frequency of the control circuit unit and an operating frequency of the radio circuit unit should be different from each other.

A vibrator, a speaker, a microphone, a receiver, a light and the like are cited as examples which satisfy the condition (1) above. However, the ones which satisfy the condition (1) above are not particularly limited to these. The condition (2) is a condition which is preferably satisfied when the electronic component and the antenna are operated at the same time. As an electronic component which does not satisfy the condition (2), a camera is cited, for example. This is because a camera has a high harmonic level of a clock frequency thereof, and thus has a high noise level. As a matter of course, any of the electronic components is generally practical when built in a radio. On the assumption that an electronic component itself serves as an antenna, it goes without saying that the condition (2) cannot be applied to an electronic component in a shielding case, for example.

The condition (3) above is a condition necessary for isolation between the control signal of the control circuit unit and a radio signal of the radio circuit unit.

Figure 1:
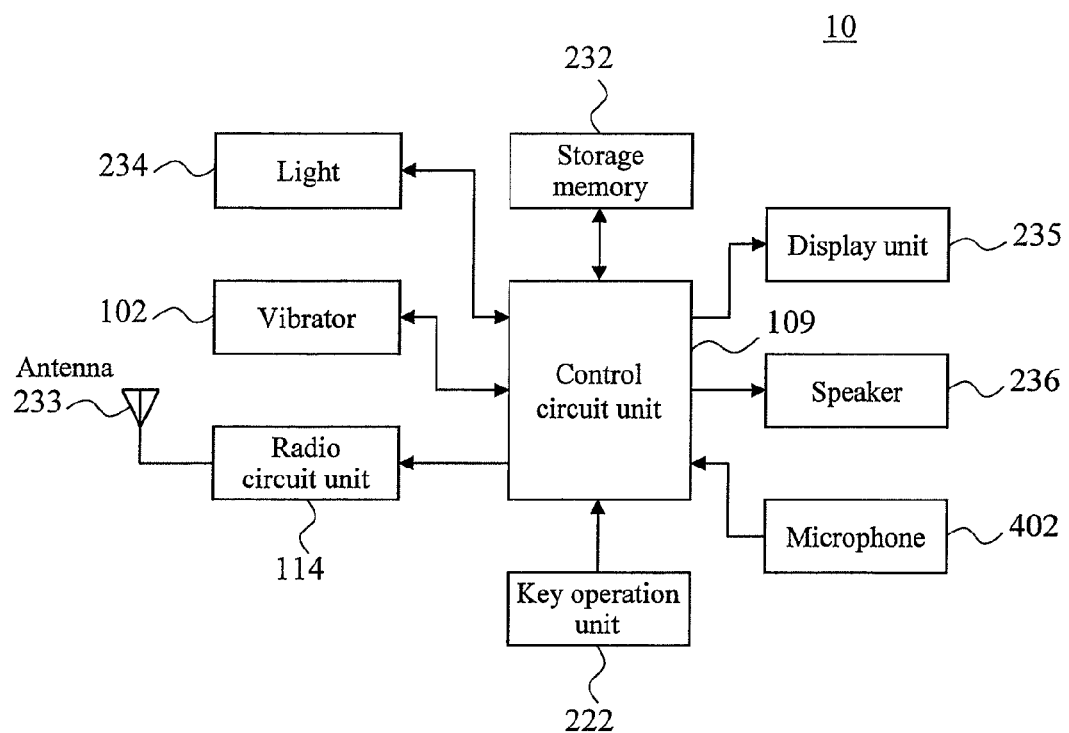
FIG. 1 is functional block diagram of mobile phones according to embodiments of the present invention.

Hereinbelow, radios according to embodiments of the present invention will be described in detail with reference to the drawings by taking mobile phones as examples. Firstly, a description is given of an example of a main configuration of the mobile phones. FIG. 1 is a functional block diagram of each of the mobile phones according to the embodiments of the present invention. As shown in FIG. 1, a mobile phone 10 according to the embodiments includes an antenna 233, a radio circuit unit 114, a vibrator 102, a control circuit unit 109 and a storage memory 232. The mobile phone 10 further includes a key operation unit 222, a light 234, a display unit 235, a speaker 236 and a microphone 402. The control circuit unit 109 controls the above functional units based on a program stored in the storage memory 232. As described above, various electronic components such as the vibrator 102, the speaker 236 and the microphone 402 are built in the mobile phone 10. Hereinbelow, the embodiments will be described concretely.

First Embodiment

FIG. 2 are diagrams showing a part of configuration example of a substrate 101 provided in a housing of a mobile phone according to a first embodiment of the present invention. This embodiment uses a vibrator with two terminals as an electronic component which is also used as an antenna. As the antenna, an antenna for Bluetooth communications is exemplified.

In Part (a) in FIG. 2A, a vibrator 102 having two power supply terminals which are a first terminal a and a second terminal b is arranged on the substrate 101 in the mobile phone 10. The vibrator 102 is one of essential electronic components which informs the user of an incoming call or the like during manner mode. The terminal a (hereinafter, the first terminal) of the vibrator 102 is connected to the control circuit unit 109 (a control circuit unit of the vibrator) via a first wiring a103, a coil a (hereinafter, a high-frequency cutoff unit) 104 and a second wiring a105. In addition, the terminal b (hereinafter, the second terminal) of the vibrator 102 is connected to the control circuit unit 109 via a first wiring b106, a coil b (hereinafter, a high-frequency cutoff unit) 107 and a second wiring b108. A capacitor b (hereinafter, a second high-frequency short-circuit unit) 111 is connected between the first wiring a103 and the first wiring b106. One end of an antenna sub-element 112 is connected to the first wiring a103 via a capacitor a (hereinafter, a first high-frequency short-circuit unit) 110. The other end of the antenna sub-element 112 is connected to a radio circuit unit 114 via a matching circuit 113. The radio circuit unit 114 is grounded to a GND of the substrate 101.

The control circuit unit 109 and the vibrator 102 operate at a frequency $\lambda 1$ (hereinafter, a first frequency), while an antenna unit 115 which is a main part of the antenna and which includes the radio circuit unit 114, the antenna sub-element 112 and the vibrator 102 operates at a frequency $\lambda 2$ (hereinafter, a second frequency). Here, the frequency $\lambda 1$=1 MHz; the frequency $\lambda 2$ corresponds to a center frequency utilized for Bluetooth communications, and $\lambda 2$=2440 MHz; $\lambda 2$ and $\lambda 1$ are frequencies different from each other; and $\lambda 2 > \lambda 1$ holds true.

Meanwhile, the coil a104 and the coil b107 are designed to have a self resonant frequency of $\lambda 2$ and a pass characteristic as shown in Part (d) in FIG. 2C, and thus form a short-circuit connection at the frequency $\lambda 1$, and an open-circuit connection at the frequency $\lambda 2$. The capacitor a110 and the capacitor b111 are designed to have a pass characteristic as shown in Part (e) in FIG. 2C, and thus form an open-circuit connection at the frequency $\lambda 1$, and a short-circuit connection at the frequency $\lambda 2$.

Part (b) in FIG. 2B is a diagram showing an equivalent circuit in a case where the vibrator 102 operates at the frequency $\lambda 1$ in the mobile phone in this embodiment. Part (c) in FIG. 2B is a diagram showing an equivalent circuit in a case where the antenna unit 115 operates at the frequency 22 in the mobile phone in this embodiment.

In the mobile phone according to this embodiment, at the frequency $\lambda 1$ at which the vibrator 102 operates, the terminals of the coil a104 and the coil b107 form a short-circuit connection, while terminals of the capacitor a110 and the capacitor b111 form an open-circuit connection. Thus, the mobile phone forms such an equivalent circuit diagram as shown in Part (b) in FIG. 2B, and is not influenced by the wirings between the vibrator 102 and the radio circuit unit 114 at the frequency $\lambda 1$. Accordingly, the vibrator 102 operates with no problem.

On the other hand, at the frequency $\lambda 2$ at which the antenna unit 115 operates, the terminals of the coil a104 and the coil b107 form an open-circuit connection, while terminals of the capacitor a110 and the capacitor b111 form a short-circuit connection. In other words, at least at the frequency $\lambda 2$, the vibrator 102 and the ground (GND) are connected to each other only via the radio circuit unit 114.

Accordingly, the mobile phone forms an equivalent circuit diagram as shown in Part (c) in FIG. 2B, and in addition to the antenna sub-element 112, the vibrator 102 and both of its terminals can be utilized as an antenna radiating element. This is because most of parts, of the vibrator 102, which contribute to antenna radiation are metal parts of the vibrator 102, and among the metal parts, antenna feeding is performed to metal terminals since antenna feeding can be easily performed, thereto in the embodiments of the present invention. Generally, since an electronic component such as the vibrator 102 is very small, the metal terminals and the other metal parts in the vibrator 102 are capacitively coupled to each other or in a connected state. Thus, in a high frequency band in which the antenna is used, the metal parts in the vibrator 102 can be considered to be integrated.

Therefore, the vibrator itself can be utilized as an antenna by only configuring the terminals of the vibrator 102 to perform antenna feeding like the first embodiment of the present invention. Even if the metal terminals of the vibrator 102 are not electrically coupled to the other metal parts of the vibrator 102, the metal terminals of the vibrator 102 and the wirings and the like connected to the metal terminals can be used for at least antenna radiation.

Part (f) in FIG. 2D is a diagram showing a configuration example with a ground conductor (a substrate GND) of the substrate 101 also taken into consideration. As shown in Part (f) in FIG. 2D, the radiating element including the vibrator 102 and the antenna sub-element 112 and serving as a major part for antenna radiation is adjusted so that the electrical length thereof can be $\lambda/4$. The radiating element operates as a $\lambda/4$ monopole antenna for which the substrate GND of the substrate 101 is used as the ground conductor.

As described above, the mobile phone according to this embodiment makes it possible to operate the vibrator as the antenna without hindering an operation of the vibrator itself. In addition, since the vibrator itself can be utilized as an antenna radiating element by performing antenna feeding to the terminals of the vibrator, the mobile phone according to this embodiment has advantages that antenna feeding is easily performed and that a configuration of the antenna is simple. Furthermore, since the vibrator itself can be utilized as a part of the antenna radiating element, an antenna sub-element can be reduced in size by the electrical length of the vibrator. Besides, the antenna unit 115 can be operated as a 2l4 monopole antenna, and the substrate GND on the substrate 101 can be utilized for antenna radiation even though the antenna radiating element including the vibrator 102 and the antenna sub-element 112 is small. Thus, a high antenna performance can be obtained.

In addition, as shown in FIG. 2A, the coil a104 and the coil b107 are arranged between the vibrator 102 and the control circuit unit 109. This can check an impact of impedance due to connection with the control circuit unit 109, in a case of using the vibrator 102 as the antenna. Thus, it is possible to check deterioration of an antenna characteristic due to the aforementioned impact of impedance. Note that the impact of impedance due to connection with the control circuit unit 109 refers to an impact which is given in the following state. Specifically, if none of the coil a104 or coil b107 is provided as shown in Part (f2) in FIG. 2, the wirings between the control circuit unit and the vibrator are also operated as a part of the antenna at the operating frequency $\lambda 2$ of the antenna. In this case, unlike the circuit diagram shown in Part (f) in FIG. 2F, the antenna unit 115 including the vibrator 102 and the antenna sub-element 112 does not have the electrical length of $\lambda/4$. The degree of the impact of impedance due to connection with the control circuit unit 109 depends on the length of the wirings between the control circuit unit 109 and the vibrator 102, an output impedance of the control circuit unit 109, and the like. However, arranging the coil a104 and the coil b107 between the control circuit unit 109 and the vibrator 102 as in this embodiment makes it possible to prevent the impact of impedance due to connection with the control circuit unit 109.

Furthermore, arranging the capacitor b111 between the terminals of the vibrator 102 makes it possible to use both the terminals of the vibrator 102 as the antenna radiating element. This enables antenna configuration without depending on the connection state of the terminals inside the vibrator 102.

Note that the connection state of the terminals inside the vibrator 102 is represented by the following states. As shown in Part (g) in FIG. 2G, the terminals a and b can be considered to form an open-circuit connection inside the vibrator, depending on the vibrator 102 used. In addition, as shown in Part (h) in FIG. 2G, there also exist the terminals a and b having a capacitive. This is because the terminals a and b are located very close to each other inside the vibrator or a metal part 102g and the terminals a and b inside the vibrator are coupled very strongly with each other, and thus the capacitive of the terminals a and b cannot be ignored at the frequency $\lambda 2$ used for the antenna. This embodiment shows that the antenna can be configured regardless of such connection states.

Here, as shown in Part (a) in FIG. 3, suppose a configuration in which the capacitor b111 described by referring to Part (a) in FIG. 2A is removed and antenna feeding is performed to only the first terminal a of the vibrator 102. Also in this case, approximately similar effects can be obtained as in the configuration described by referring to FIG. 2 described above. Furthermore, in a case where the connection state between the terminals a and b inside the vibrator can be considered to be an open-circuit connection as shown in Part (g) in FIG. 2G, the impact of impedance due to the wiring from the terminal b of the vibrator 102 to the control circuit unit 109 can be ignored. Thus, even a configuration, as shown in Part (b) in FIG. 3, in which the capacitor b111 and the coil b107 are removed from the configuration shown in Part (a) in FIG. 2A can provide the similar effects. In this case, the circuit can be simplified. As described above, it is preferable that a circuit configuration itself in a case of using an electronic component as an antenna be appropriately changed depending on the circuit configuration of the electronic component.

Moreover, it is possible to cause the vibrator 102 to operate as the antenna while causing the vibrator 102 to operate as an actual vibrator at the same time. Specifically, this is achieved because the fact that the frequency $\lambda 1$ for operating the vibrator 102 and the frequency $\lambda 2$ used for the antenna are different from each other is utilized, and thus operations at the respective frequencies $\lambda 1$ and $\lambda 2$ can be isolated from each other as shown in Parts (b) and (c) in FIG. 2B by utilizing the high-frequency cutoff units and the high-frequency short-circuit units. Meanwhile, in a case where $\lambda 1 = 1$ MHz and $\lambda 2 = 2440$ MHz as in the first embodiment of the present invention, or a case where $\lambda 1$ is different from $\lambda 2$ by approximately 1000 MHz, the difference in value between $\lambda 1$ and $\lambda 2$ is large enough, and thus the frequency pass characteristic of the high-frequency cutoff units and the high-frequency short-circuit units need not to be designed very strictly. Accordingly, coils can be used for the high-frequency cutoff units, and capacitors can be used for the high-frequency short-circuit units. Therefore, $\lambda 1$ and $\lambda 2$ are preferably different from each other as largely as possible. It is more preferable in such a case that a control signal of $\lambda 1$ is an on/off switch signal.

Note that electronic components other than the vibrator may be used as an electronic component used in the mobile phone according to this embodiment. As examples of other usable electronic components, a speaker, a microphone and the like can be cited.

The examples using the speaker and the microphone will be described in detail later.

Second Embodiment

Part (a) in FIG. 4A is a diagram showing a configuration example of a mobile phone according to a second embodiment of the present invention. This embodiment is a modification of the first embodiment of the present invention, and has a configuration in which an antenna of the mobile phone is operated as an inverted F antenna. Part (b) in FIG. 4B is a diagram showing an equivalent circuit diagram, concerning the mobile phone in this embodiment, in a case where a vibrator 202 which is an electronic component operates at a frequency $\lambda 1$. Part (c) in FIG. 4B is a diagram showing an equivalent circuit diagram in a case where an antenna unit 215 operates at a frequency $\lambda 2$.

As shown in Part (a) in FIG. 4A, the mobile phone in this embodiment basically has approximately the same configuration as that of the aforementioned first embodiment. However, the mobile phone is different in that the matching circuit 113 in Part (a) in FIG. 2A is eliminated and that a GND ground is provided to an antenna sub-element 212 in Part (a) in FIG. 4A. Like the first embodiment of the present invention, this embodiment also sets the operating frequency $\lambda 1$ of the vibrator 202 to 1 MHz and the operating frequency $\lambda 2$ of the antenna unit 215 to 2440 MHz.

In this configuration, at the frequency $\lambda 1$ at which the vibrator 202 operates, terminals of a coil a204 and a coil b207 form a short-circuit connection, while terminals of a capacitor a210 and a capacitor b211 form an open-circuit connection. Thus, this mobile phone forms such an equivalent circuit as shown in Part (b) in FIG. 4B. Accordingly, the vibrator 202 operates with no problem at the frequency $\lambda 1$.

On the other hand, at the frequency $\lambda 2$ at which the antenna unit 215 operates, terminals of the coil a204 and the coil b207 form an open-circuit connection, while the terminals of the capacitor a210 and the capacitor b211 form a short-circuit connection. Accordingly, this mobile phone forms such an equivalent circuit diagram as shown in Part (c) in FIG. 4B, and in addition to the antenna sub-element 212, the terminals of the vibrator 202 can be utilized as an antenna radiating element. Furthermore, since a radio circuit unit 214 is grounded to a GND of a substrate 201 and the antenna sub-element 212 is provided with a ground point to the GND of the substrate 201, the antenna unit 215 can be operated as an inverted F antenna.

Also in this embodiment similarly to the aforementioned first embodiment, the vibrator itself can be utilized as a part of an antenna at a frequency used for communications. Thus, the volume of the antenna including the vibrator and the antenna sub-element can be reduced as compared to a case where the vibrator is not used as the antenna. As a matter of course, when the connection state of the terminals inside the vibrator 202 can be considered to be an open-circuit connection at the frequency $\lambda 2$, the capacitor b211 may be eliminated. Even in this case, the antenna can be configured with no problem. Furthermore, even if the coil b207 is eliminated, the vibrator can be utilized with no problem as well. Although a description has not been given in this embodiment, it goes without saying that a matching circuit may be provided as in the first embodiment of the present invention.

Third Embodiment

Next, a description is given of a mobile phone in a third embodiment of the present invention by referring to the drawings. Note that the third embodiment of the present invention is a modification of the mobile phone according to the first embodiment of the present invention, and is characterized by having an antenna configuration in which antenna feeding to a reinforcing shield member is performed in a case where the reinforcing shield member is attached to a vibrator. Part (a) in FIG. 5A is a diagram showing a circuit configuration of the mobile phone according to this embodiment. Part (b) in FIG. 5B is a diagram showing an equivalent circuit diagram, concerning the mobile phone in this embodiment, in a case where a vibrator 302 operates at a frequency λ1. Part (c) in FIG. 5B is a diagram showing an equivalent circuit, concerning the mobile phone in this embodiment, in a case where an antenna unit 315 operates at a frequency λ2.

As shown in Part (a) in FIG. 5A, the mobile phone in the third embodiment of the present invention has approximately the same configuration as that of the mobile phone in the aforementioned first embodiment, and is different in that the reinforcing shield member of the vibrator 302 in part (a) in FIG. 5A and an antenna sub-element 312 are connected with each other. Like the first embodiment of the present invention, this embodiment also sets the operating frequency λ1 of the vibrator 302 to 1 MHz and the operating frequency λ2 of the antenna unit 315 to 2440 MHz.

At the frequency λ1 at which the vibrator 302 operates, terminals of a coil a304 and a coil b307 form a short-circuit connection, while terminals of a capacitor a310 and a capacitor b311 form an open-circuit connection. Thus, the mobile phone forms such a circuit diagram as shown in Part (b) in FIG. 5B. Accordingly, the vibrator 302 operates with no problem at the frequency λ1.

On the other hand, at the frequency λ2 at which the antenna unit 315 operates, the terminals of the coil a304 and the coil b307 form an open-circuit connection, while the terminals of the capacitor a310 and the capacitor b311 form a short-circuit connection. Accordingly, the mobile phone according to this embodiment forms such a circuit diagram as shown in Part (c) in FIG. 5B, and in addition to the antenna sub-element 312, the terminals of the vibrator 302 and the reinforcing shield member can be utilized as an antenna radiating element.

Also in this case, the same effects as those in the first embodiment of the present invention can be obtained. Furthermore, since the reinforcing shield member of the vibrator can be used as an antenna, the height of the antenna can be secured and the antenna performance is expected to be enhanced. In other words, since the reinforcing shield member of an electronic component is generally located at the outermost position of the electronic component, it is possible to make the best use of metal parts of the electronic component.

Note that when the reinforcing shield member of the vibrator and the terminals of the vibrator can be considered to form an open-circuit connection at the frequency λ2, at least one of the coil a304, the coil b307, the capacitor a310 and the capacitor b311 may be eliminated. Even in this case, an antenna configuration can be achieved with no problem.

As described above, by utilizing the reinforcing shield member of the vibrator as the antenna, reduction of the antenna in size can be achieved.

Here, in order to check how the number of feeding terminals of the vibrator gives an impact on an antenna characteristic, the antenna characteristic has been actually evaluated by using a vibrator of a two-terminal mounted type. Note that an antenna for Bluetooth communications is assumed.

Part (d1) in FIG. 5C, Part (d2) in FIG. 5D, and Part (d3) in FIG. 5E respectively show layout diagrams of an evaluated substrate subjected to the antenna characteristic evaluation. Part (d1) in FIG. 5C is a diagram showing a layout diagram of an evaluated substrate 101 at the time of performing antenna feeding to only one terminal of a vibrator 102 (a Measurement Condition 1)). Part (d2) in FIG. 5D shows a layout diagram of the evaluated substrate at the time of performing antenna feeding to two terminals of the vibrator 102 (a Measurement Condition 2)). Part (d1) in FIG. 5C and Part (d2) in FIG. 5D correspond to the first embodiment of the present invention. Part (d3) in FIG. 5E shows a layout diagram of the evaluated substrate at the time of performing antenna feeding to the two terminals of the 102 vibrator and a reinforcing shield member of the vibrator (a Measurement Condition 3)), and corresponds to the third embodiment of the present invention. In any of the cases in Part (d1) in FIG. 5C, part (d2) in FIG. 5D and Part (d3) in FIG. 5E, measurement axes based on which the antenna measurements are made are as shown in the figures.

Part (e) in FIG. 5F shows average gain characteristics on ZX plane which are antenna radiation characteristics under the respective measurement conditions. Part (f) in FIG. 5F shows return loss characteristics under the respective measurement conditions. As shown in Part (e) in FIG. 5F, a comparison in average gain characteristic on ZX plane among the measurement conditions results in (Measurement Condition 3))>(Measurement Condition 2))>(Measurement Condition 1)). It is found that the antenna characteristic becomes better as the number of terminals for antenna feeding becomes larger. As shown in Part (f) in FIG. 5F, a comparison in return loss characteristic results in (Measurement Condition 3))>(Measurement Condition 2))>(Measurement Condition 1)). In this respect, the return loss becomes smaller as a radiation loss utilized as antenna radiation becomes larger, and becomes smaller as the other losses become larger. It is preferable that an antenna be designed so that the return loss characteristic can be minimized as much as possible from a designing viewpoint. Thus, values of the return losses are matched and adjusted to be −10 dB or less in all the measurement conditions.

As a result of a comparison between Measurement Condition 1) and Measurement Condition 2), the antenna radiation is poor for a small return loss characteristic in Measurement Condition 1). Thus, it is found that the loss is simply large in Measurement Condition 1). The difference results from a difference in the number of terminals for antenna feeding. Thus, it is found that as the number of terminals of an electronic component for antenna feeding becomes larger, the loss becomes smaller and the antenna characteristic becomes better.

As a result of a comparison between Measurement Condition 2) and Measurement Condition 3), the antenna radiation is similarly poor for a small return loss characteristic in Measurement Condition 2). In addition, a comparison in average gain characteristic on ZX plane shows that the characteristic is improved by approximately 0.5 dB in Measurement Condition 2) than in Measurement Condition 1) and that the characteristic is improved by approximately 2 dB in Measurement Condition 3) than in Measurement Condition 2). From this, it is found that Measurement Condition 3) shows a larger degree of improvement. The difference results from a difference in whether or not to perform antenna feeding to the reinforcing shield member of the vibrator 102. This means that antenna feeding to the reinforcing shield member of the vibrator in addition to the terminals of the vibrator 102 further enhances the antenna characteristic. This is because the metal part of the electronic component can be made the best use of because the reinforcing shield member of the vibrator 102 is located at the outermost position among the metal parts of the vibrator 102, and because the loss is made small.

Fourth Embodiment

Part (a) in FIG. 6A is a diagram showing a configuration of a circuit formed on a substrate 401 of a mobile phone according to a fourth embodiment of the present invention. Note that this embodiment has a configuration formed in a case where a microphone having three terminals is used as an electronic component also used as an antenna. As the antenna, an antenna for Bluetooth communications is exemplified.

In Part (a) in FIG. 6A, a microphone 402 having three terminals which are a first terminal a, a second terminal b and a third terminal c is arranged on the substrate 401 in a mobile phone according to this embodiment. The first terminal a of the microphone 402 is connected to a control circuit unit 409 via a first wiring a403, a coil a404 and a second wiring a405. In addition, the second terminal b of the microphone 402 is connected to the control circuit unit 409 via a first wiring b406, a coil b407 and a second wiring b408, and a capacitor b411 is connected between the first wring a403 and the first wiring b406. Likewise, the third terminal c of the microphone 402 is connected to the control circuit unit 409 via a first wiring c417, a coil c (hereinafter, a high-frequency cutoff unit) 418 and a second wiring c419, and a capacitor c (hereinafter, a second high-frequency short-circuit unit) 416 is connected between the first wiring a403 and the first wiring c417.

One end of an antenna sub-element 412 is connected to the first wiring c417 via the capacitor a410, while the other end of the antenna sub-element 412 is connected to a radio circuit unit 414 via a matching circuit 413. The radio circuit unit 414 is grounded to a GND of the substrate 401.

Here, an antenna unit 415 including the radio circuit unit 414 and the antenna sub-element 412 operates at a frequency $\lambda 2$ used for Bluetooth communications, and $\lambda 2 = 2440$ MHz is set. The control circuit unit 409 and the microphone 402 operate at a frequency $\lambda 1$, and $\lambda 1 = 1$ MHz is set. Thus, $\lambda 2 > \lambda 1$ holds true. In addition, the coil a404, the coil b407 and the coil c418 have a self resonant frequency of $\lambda 2$, form a short-circuit connection at the frequency $\lambda 1$, and form an open circuit connection at the frequency $\lambda 2$. The capacitor a410, the capacitor b411 and the capacitor c416 form an open-circuit connection at the frequency $\lambda 1$, and form a short-circuit connection at the frequency $\lambda 2$.

Part (b) in FIG. 6B shows an equivalent circuit diagram, concerning the mobile phone according to this embodiment, in a case where the microphone 402 operates at the frequency Part (c) in FIG. 6B is a diagram showing an equivalent circuit diagram, concerning the mobile phone according to this mobile phone implemented, in a case where the antenna unit 415 operates at the frequency $\lambda 2$.

In the mobile phone according to this embodiment, terminals of the coil a404, the coil b407 and the coil c418 form a short-circuit connection. Terminals of each of the capacitor a410, the capacitor b411 and the capacitor c416 form an open-circuit connection. Thus, the mobile phone forms such a circuit diagram as shown in Part (b) in FIG. 6B, and the microphone 402 operates with no problem at the frequency $\lambda 1$.

On the other hand, at the frequency $\lambda 2$ at which the antenna unit 415 operates, the terminals of the coil a404, the coil b407 and the coil c418 form an open-circuit connection, while the terminals of the capacitor a410, the capacitor b411 and the capacitor c416 form a short-circuit connection. Thus, the mobile phone according to this mobile phone implemented forms such a circuit diagram as shown in Part (c) in FIG. 6B, and thus in addition to the antenna sub-element 412, all the three terminals of the microphone 402 can be utilized as an antenna radiating element. Moreover, the antenna unit 415 is adjusted so as to have an electrical length of $\lambda/4$, and operates as a $\lambda/4$ monopole antenna using the GND of the substrate 401 as a ground conductor.

As described above, also in the case where the microphone having the three terminals is used as the electronic component, the present invention is applicable thereto according to the same idea. As a matter of course, when the three terminals of the microphone can be considered to form the open-circuit connection with each other at the $\lambda 2$, at least one of the coil a404, the coil b407, the capacitor b411 and the capacitor c416 may be eliminated. Even in this case, an antenna configuration can be achieved with no problem. In addition, in a case of an electronic component having four or more terminals as well, each of terminals of the electronic component and the control circuit unit are mutually connected by a corresponding wire connecting the two via a coil, and capacitors are connected among the terminals. Thereby, in the case of the electronic component having four or more terminals as well, the present invention is applicable thereto.

Note that although the description for the embodiment of the present invention has been given by taking the vibrator and the microphone as examples of the electronic components, electronic components such as a speaker, a receiver and the like may be used in place of the vibrator and the microphone. In addition, the description has been given by taking, as an example, an electronic component operating at the certain frequency $\lambda 1$, but this embodiment may also be applicable to one using an electronic component controlled only on an on/off basis.

Fifth Embodiment

Next, a description is given of a mobile phone in a fifth embodiment of the present invention by referring to the drawings. Note that the fifth embodiment of the present invention is a modification of the mobile phone according to the third embodiment of the present invention, and is an example in which one terminal of a vibrator having two terminals is applied as a GND terminal.

Part (a) in FIG. 7A is a diagram showing a configuration example of a mobile phone according to this embodiment. Part (b) in FIG. 7B is a diagram showing an equivalent circuit diagram, concerning the mobile phone in this embodiment, in a case where a vibrator 502 operates at a frequency $\lambda 1$. Part (c) in FIG. 7B is a diagram showing an example of an equivalent circuit diagram, concerning the mobile phone in this embodiment, in a case where an antenna unit 515 operates at a frequency $\lambda 2$. Like the first embodiment of the present invention, this embodiment also sets the operating frequency 21 of the vibrator 502 to 1 MHz and the operating frequency $\lambda 2$ of the antenna unit 515 to 2440 MHz.

As shown in Part (a) in FIG. 7A, the mobile phone in this embodiment has approximately the same configuration as that of the mobile phone in the third embodiment of the present invention. However, the mobile phone in this embodiment is different in that a reinforcing shield member of the vibrator 502 and an antenna sub-element 512 in Part (a) in FIG. 7A are connected to each other at a position which is opposite to and away from terminals of the vibrator 502. In addition, the mobile phone is different in that: a first wiring a503 connected to a terminal a of the vibrator 502 is directly connected to a GND of a substrate 501; a second wiring a505 connected to a control circuit unit 509 is directly connected to the GND of the substrate 501; and the coil a304 of the mobile phone in the third embodiment in Part (a) in FIG. 5A is not provided.

At the frequency λ1 at which the vibrator 502 operates, terminals of a coil a504 form a short-circuit connection, while terminals of a capacitor a510 and a capacitor b511 form an open-circuit connection. Thus, the mobile phone according to this embodiment forms such a circuit diagram as shown in Part (b) in FIG. 7B. Accordingly, the vibrator 502 operates with no problem at the frequency λ1.

On the other hand, at the frequency λ2 at which the antenna unit 515 operates, the terminals of the coil a504 form an open-circuit connection, while the terminals of the capacitor a510 and the capacitor b511 form a short-circuit connection. Accordingly, the mobile phone according to this embodiment forms such a circuit diagram as shown in Part (c) in FIG. 7B, and the antenna unit 515 can be operated as a modified inverted F antenna of end GND short-circuit type. As a matter of course, in addition to the antenna sub-element 512, the terminals of the vibrator 502 and the reinforcing shield member of the vibrator 502 can be utilized as an antenna radiating element.

Also in the case described above, the same effects as those obtained by the communication technique according to the first embodiment of the present invention can be obtained.

Note that when the reinforcing shield member of the vibrator and terminals of the vibrator can be considered to form an open-circuit connection at the frequency λ2, at least one of the coil b507 and the capacitor b511 need not be provided. Even in this case, an antenna can be configured with no problem.

Sixth Embodiment

Next, a description is given of a mobile phone in a sixth embodiment of the present invention by referring to the drawings. Note that the sixth embodiment of the present invention is an example in which a vibrator in a slide type mobile phone is used also as an antenna for Bluetooth.

Part (a) in FIG. 8A is a diagram at the time when the slide type mobile phone according to this embodiment is slid. Parts (b-1 and b-2) in FIG. 8A and Part (c) in FIG. 8B are diagrams showing a state in which the slide type mobile phone according to this embodiment is closed.

As shown in Part (a) in FIG. 8A, in the mobile phone in this embodiment, a first housing 601 and a second housing 602 are configured to be slidable. In a state where the mobile phone is slid (opened), a microphone 605 and operation keys 606 are arranged on the front surface side of the first housing 601 in such a manner as to be exposed to the outside, and a display unit 603 and an earphone 604 are arranged on the front surface side of the second housing 602. In addition, as shown in Part (b-2) in FIG. 8A, when the mobile phone is viewed from the back side in a closed state, a retractable whip antenna 607 for receiving one seg broadcasting, a light 608 and a camera 609 are arranged thereon. Furthermore, as shown in Part (c) in FIG. 8B, a first substrate 610 is built in the first housing 601.

Specifically, Part (d) in FIG. 8B is a diagram showing in detail a configuration example of the first substrate 610 concerning the slide type mobile phone according to this embodiment. As shown in Part (d) in FIG. 8B, a third substrate 611 is arranged above the first substrate 610 at a certain height in a normal direction of the substrate, and the third substrate 611 and the first substrate 610 are connected to each other by a wiring λ1 with an unillustrated connector placed in between. The aforementioned light 608 is connected from the third substrate 611 by a wiring λ2, and the aforementioned camera 609 is arranged in an upper portion of the first substrate 610.

In addition, a battery 615 is arranged in a portion lower than (in a region away from) the third substrate 611 in a substrate surface direction.

In the mobile phone in this embodiment, a total of four antennas are arranged in the first housing 601. Firstly, an antenna a613 is an antenna for W-CDMA, and arranged on the left side of the camera 609 in the first substrate 610. Antenna feeding is performed from a vicinity of an upper left end portion of the first substrate 610. An antenna b614 is a GSM antenna for international roaming, and arranged in a lower end portion of the first substrate 610. Antenna feeding is performed from a vicinity of a lower left end portion of the first substrate 610. The retractable whip antenna 607 is an antenna for receiving one seg broadcasting, and antenna feeding is performed from a vicinity of an upper right end portion of the third substrate 611. A vibrator 612 is arranged on the right side of the light 608. The vibrator 612 has the same circuit configuration as in the third embodiment of the present invention, and is also used as an antenna for Bluetooth. Antenna feeding is performed from a vicinity of an upper right end portion of the first substrate 610.

Although it is often difficult to secure areas for four antennas in the case where the antennas are arranged in the mobile phone according to this embodiment as shown in Part (d) in FIG. 8B, a limited space in the housing of the mobile phone can be effectively utilized by enabling a dead space where the vibrator 612 is arranged to be effectively utilized as an antenna space as in this embodiment.

Seventh Embodiment

Next, a description is given of a mobile phone in a seventh embodiment of the present invention by referring to the drawings. Note that the seventh embodiment of the present invention is an example in which a speaker of a clamshell-type mobile phone is used also as an antenna for GPS reception. Note that the speaker is one having two terminals Part (a) in FIG. 9A is a diagram showing an external configuration example at the time when the clamshell type mobile phone according to this embodiment is opened. Part (b) in FIG. 9A and Part (c) in FIG. 9A are diagrams showing an external configuration example at the time when the clamshell type mobile phone according to this embodiment is closed.

As shown in Part (a) in FIG. 9A, the mobile phone in this embodiment is an openable and closable clamshell-type mobile phone in which a first housing 701 and a second housing 702 are connected with each other so as to be rotationally movable with a hinge 704 placed in between. A microphone 705 and operation keys 706 are arranged on the first housing 701, while a display unit 703 and an earphone 720 are arranged on the second housing 702. A speaker 708 is built in the hinge 704, and the hinge 704 is provided with an unillustrated sound emission hole for the speaker 708.

As shown in Part (c) in FIG. 9A, when the mobile phone is viewed from the back side in the closed state, an storable whip antenna 707 for receiving one seg broadcasting and a camera 709 are arranged thereon. Furthermore, as shown in Part (d) in FIG. 9B, a first substrate 710 is built in the first housing 701.

Specifically, Part (e) in FIG. 9B is a diagram showing a detailed configuration of the first substrate 710 of the clamshell type mobile phone according to this embodiment. As shown in Part (e) in FIG. 9B, a third substrate 711 is arranged above the first substrate 710 at a certain height in a normal direction of the substrate, and the third substrate 711 and the first substrate 710 are connected to each other by a wiring λ3 with a connector placed in between. The aforementioned camera 709 is arranged in an upper portion of the first substrate 710. In addition, a battery 715 is arranged in a portion lower than the third substrate 711 in a direction along a substrate surface.

In the mobile phone in this embodiment, a total of three antennas are arranged in an upper portion of the first housing 701 including the hinge 704. Firstly, an antenna 714 is an antenna for both of a W-CDMA band and a GSM band, and arranged to extend from the left to upper portions of the camera 709 of the first substrate 710. Antenna feeding is performed from a vicinity of an upper left end portion of the first substrate 710. The storable whip antenna 707 is an antenna for receiving one seg broadcasting, and antenna feeding is performed from a vicinity of an upper right end portion of the first substrate 710.

The speaker 708 is arranged in the hinge 704 in a built-in state. The two terminals of the speaker 708 are connected to speaker wirings 712, and are connected to a speaker connector 713 on the first substrate 710. The speaker wirings 712 are formed as a pattern in a flexible substrate, and need to be fixed with a resin-made base or the like to come in contact with the terminals of the speaker 708. Here, illustration of the resin base or the like is omitted.

An antenna for GPS reception can be configured by regarding the two speaker wirings 712 as the terminals of the speaker 708 and performing antenna feeding to the terminals. Hence, the speaker 708 can be used also as the antenna for GPS reception. Here, a description is briefly given by using a detailed diagram to show that the speaker 708 can also be used as the antenna.

Part (f) in FIG. 9C is an enlarged diagram of a circuit configuration diagram in a case where antenna feeding is performed to the speaker 708. It is found that when a terminal a and a terminal b of the speaker 708 are considered to include the speaker wirings 712 respectively, the same circuit configuration as in the first embodiment of the present invention is formed as shown in Part (f) in FIG. 9C. The above shows that a dead space of the hinge can be effectively utilized as an antenna space by applying a technique by which the speaker arranged in the hinge can also be used as an antenna for GPS reception.

Eighth Embodiment

Next, a description is given of a mobile phone in an eighth embodiment of the present invention by referring to the drawings. Note that the eighth embodiment has a different housing structure from that of the mobile phone in the seventh embodiment of the present invention, and a diagram therefor shows an example in which a speaker is used as an antenna for GPS reception like the seventh embodiment. Note that the speaker is one having two terminals.

As shown in Parts (a-1 and a-2) in FIG. 10A, in the housing structure of the mobile phone in this embodiment, a first housing 801 and a third housing 818 are connected with each other so as to be rotationally movable with a hinge 804 placed in between, and a second housing 802 including a display unit 803 and an earphone 820 arranged thereon is coupled to the third housing 818 by a rotating mechanism unit 819 which rotates on a plane parallel to a housing surface of the third housing 818. In the mobile phone in this embodiment, this housing structure enables the second housing 802 including the display unit 803 to extend horizontally as shown in Part (a-2) in FIG. 10A. In addition, a microphone 805 and operation keys 806 are arranged on the first housing 801, and a speaker 808 is arranged in the hinge 804. The hinge 804 is provided with a sound emission hole for the speaker 808.

Part (b) in FIG. 10A and Part (c) in FIG. 10A are diagrams showing an external configuration example at the time when the mobile phone according to this embodiment is closed. As shown in Part (c) in FIG. 10A, when the mobile phone is viewed from the back side in the closed state, a storable whip antenna 807 for receiving one seg broadcasting and a camera 809 are arranged thereon. Furthermore, as shown in Part (d) in FIG. 10B as a diagram (viewed from the back) in the closed state, a first substrate 810 is built in the first housing 801.

Specifically, Part (e) in FIG. 10B is a diagram showing a detailed configuration of the first substrate 810 of the mobile phone according to this embodiment. As shown in Part (e) in FIG. 10B, a third substrate 811 is arranged above the first substrate 810 at a certain height in a normal direction of the substrate, and the third substrate 811 and the first substrate 810 are connected to each other by a wiring λ4 with a connector placed in between. The aforementioned camera 809 is arranged in an upper portion of the first substrate 810. In addition, a battery 815 is arranged in a portion lower than the third substrate 811 in a direction along a substrate surface.

In the mobile phone in this embodiment, a total of three antennas are arranged in an upper portion of the first housing 801 including the hinge 804. Firstly, an antenna 814 is an antenna for both of a W-CDMA band and a GSM band, and arranged to extend from the left to upper portions of the camera 809 of the first substrate 810. Antenna feeding is performed from a vicinity of an upper left end portion of the first substrate 810. The storable whip antenna 807 is an antenna for receiving one seg broadcasting, and antenna feeding is performed from a vicinity of an upper right end portion of the first substrate 810.

The speaker 808 is arranged in the hinge 804 in a built-in state. The two terminals of the speaker 808 are connected to speaker wirings 812, and are connected to a speaker connector 813 on the first substrate 810. The speaker wirings 812 are formed as a pattern in a flexible substrate, and need to be fixed with a resin-made base or the like to come in contact with the terminals of the speaker 808. Here, illustration of the resin base or the like is omitted.

An antenna for GPS reception can be configured by regarding the two speaker wirings 812 as the terminals of the speaker 808 and performing antenna feeding to the terminals. Hence, the speaker 808 can be used also as the antenna for GPS reception. Formed is a detailed circuit diagram in this embodiment which is the same circuit configuration diagram as in the seventh embodiment of the present invention shown in Part (f) in FIG. 9C. It is found that the same circuit configuration as in the first embodiment of the present invention is formed.

The above shows that a dead space of the hinge can be effectively utilized as an antenna space by applying a technique by which the speaker arranged in the hinge can also be used as an antenna for GPS reception.

In addition, the description has been given of the mobile phone according to the eighth embodiment by taking the clamshell type one in which the housing including the display unit is rotated. However, this embodiment is applicable to one having a housing configuration in which a hinge includes two rotation axes, as long as the mobile phone has a structure including a hinge.

Ninth Embodiment

Part (a) in FIG. 11A is a diagram showing a configuration example of a mobile phone according to a ninth embodiment of the present invention. This embodiment is a modification of the first embodiment of the present invention, and is different in that the coils and the capacitors in the first embodiment are replaced with switches. Part (b) in FIG. 11B shows a block diagram concerning controls over the respective switches of this embodiment.

A control circuit unit 109 performs overall control for switching of the switches as shown in Part (b) in FIG. 11B. A switch (1a) 1101 and a switch (1b) 1102 are controlled so that connection of terminals of the switches can be switched in the following manner. When a vibrator 102 operates, the terminals of the switches final an open-circuit connection. When an antenna unit 115 operates, the terminals of the switches form a short-circuit connection. On the other hand, a switch (2a) 1103 and a switch (2b) 1104 are controlled so that connection of terminals of the switches can be switched in the following manner. When the vibrator 102 operates, the terminals of the switches form a short-circuit connection. When the antenna unit 115 operates, the terminals of the switches form an open-circuit connection.

In this configuration, in the case where the vibrator 102 operates, the terminals of the switch (2a) 1103 and the switch (2b) 1104 form a short-circuit connection, while the terminals of the switch (1a) 1101 and the switch (1b) 1102 form an open-circuit connection. Thus, the mobile phone forms such an equivalent circuit as shown in Part (c) in FIG. 11C, and the vibrator 102 operates with no problem.

On the other hand, in the case where the antenna unit 115 operates, the terminals of the switch (2a) 1103 and the switch (2b) 1104 form an open-circuit connection, while the terminals of the switch (1a) 1101 and the switch (1b) 1102 form a short-circuit connection. Accordingly, this radio forms such a circuit diagram as shown in Part (d) in FIG. 11C, and in addition to an antenna sub-element 112, the terminals of the vibrator 102 can be utilized as an antenna radiating element. This enables the antenna unit 115 to be operated as a monopole antenna.

Since the same circuit configuration as that of the first embodiment is formed in this embodiment as well, the same effects as those in the first embodiment can be obtained. As a matter of course, when the connection state of the terminals inside the vibrator 102 can be considered to be an open-circuit connection, the switch (1b) 1102 may be eliminated. Even in this case, the antenna can be configured with no problem. Furthermore, even if the switch (2b) 1104 is eliminated, the vibrator 102 can be utilized with no problem as well. However, unlike the first embodiment, when the vibrator 102 and the antenna unit 115 are simultaneously operated, signals thereof cannot be separated from each other. Thus, this embodiment is effective when the vibrator 102 and the antenna unit 115 are not simultaneously used.

Tenth Embodiment

Next, a description is given of a mobile phone in a tenth embodiment of the present invention by referring to the drawings. Note that the tenth embodiment of the present invention is a modification of the mobile phone according to the third embodiment of the present invention, and is characterized by having an antenna configuration in which antenna feeding is performed only to a reinforcing shield member in a case where the reinforcing shield member is attached to a vibrator.

Part (a) in FIG. 12A is a diagram showing a circuit configuration of the mobile phone according to this embodiment. Part (b) in FIG. 12B is a diagram showing an equivalent circuit diagram, concerning the mobile phone in this embodiment, in a case where a vibrator 302 operates at a frequency $\lambda 1$. Part (c) in FIG. 12B is a diagram showing an equivalent circuit, concerning the mobile phone in this embodiment, in a case where an antenna unit 315 operates at a frequency $\lambda 2$.

As shown in Part (a) in FIG. 12A, the mobile phone in the tenth embodiment of the present invention has approximately the same configuration as that of the mobile phone in the third embodiment, and is different in that the capacitor a310 and the capacitor b311 in Part (a) in FIG. 5A are not provided. Like the third embodiment of the present invention, this embodiment also sets the operating frequency $\lambda 1$ of the vibrator 302 to 1 MHz and the operating frequency $\lambda 2$ of the antenna unit 315 to 2440 MHz.

At the frequency $\lambda 1$ at which the vibrator 302 operates, terminals of a coil a304 and a coil b307 form a short-circuit connection, and thus the mobile phone forms such a circuit diagram as shown in Part (b) in FIG. 12B. The vibrator 302 operates with no problem at the frequency $\lambda 1$.

On the other hand, at the frequency $\lambda 2$ at which the antenna unit 315 operates, the terminals of the coil a304 and the coil b307 form an open-circuit connection, and thus the mobile phone according to this embodiment forms such a circuit diagram as shown in Part (c) in FIG. 12B. Even if the reinforcing shield member of the vibrator 302 and terminals of the vibrator 302 are electrically coupled to each other, an impact of impedance due to connection with a control circuit unit can be checked. It goes without saying that a radio circuit unit 314 can utilize, as an antenna radiating element, the reinforcing shield member of the vibrator 302 in addition to an antenna sub-element 312.

Part (d) in FIG. 12C shows a configuration example with a ground conductor (a substrate GND) of a substrate 301 also taken into consideration. The antenna unit 315 including the reinforcing shield member of the vibrator 302 and the antenna sub-element 312 is adjusted so as to have an electrical length of $\lambda/4$ at this time, and operates as a $\lambda/4$ monopole antenna in which the substrate GND of the substrate 301 is used as the ground conductor.

As described above, the mobile phone according to this embodiment enables the reinforcing shield member of the vibrator to operate also as an antenna without hindering an operation of the vibrator itself In addition, since the vibrator itself can be utilized as an antenna radiating element by directly performing antenna feeding to the reinforcing shield member of the vibrator, the mobile phone according to this embodiment has an advantage that antenna feeding can be easily performed. Moreover, since the vibrator itself can be utilized as a part of the antenna radiating element, the antenna sub-element can be reduced in size by the electrical length of the vibrator. Furthermore, since the reinforcing shield member of the vibrator can be used as the antenna, the height of the antenna can be secured, and enhancement of the antenna performance can be expected. In other words, since a reinforcing shield member of an electronic component is generally located at the outermost position of the electronic component, metal parts of the electronic component can be utilized to the maximum.

Still further, since the antenna unit 315 can be operated as the 214 monopole antenna, the substrate GND on the substrate 301 can be utilized for antenna radiation, even though the antenna radiating element including the vibrator 302 and the antenna sub-element 312 is small Thus, a high antenna performance can be obtained.

Note that in a case where the reinforcing shield member of the vibrator and the terminals of the vibrator can be considered to form an open-circuit connection, at least one of the coil a304 and the coil b307 may be eliminated. Even in this case, the antenna configuration can be achieved with no problem.

As described above, by utilizing only the reinforcing shield member of the vibrator as the antenna, reduction in size of the antenna can be achieved.

A configuration and the like are not limited to these illustrated by the attached drawings in the embodiments described above, and a modification thereto may be made as appropriate within a range in which the effects of the present invention are exerted. In addition, a modification thereto may be made as appropriate without departing from the range of the purpose of the present invention.

In particular, although the descriptions have been given by using the mobile phones in the embodiments described above, the present invention is applicable to a case of broadcast transmission and reception by each of the mobile phones instead of communication.

In addition, processing by the units of the mobile phone may be performed in the following manner. Specifically, a program for implementing the function described in the corresponding embodiment is recorded in a computer-readable recording medium, and the program recorded in this recording medium is read and executed by a computer system. Note that the "computer system" includes an OS and hardware such as a peripheral device.

In addition, in a case where a WWW system is utilized, the "computer system" includes an environment of providing (or an environment of displaying) web sites.

In addition, the "computer-readable recording medium" is a portable medium such as a flexible disk, a magneto optical disk, a ROM or a CD-ROM, or a storage device such as a hard disk built in the computer system. Moreover, the "computer-readable recording medium" includes: one which dynamically holds a program for a short time like a communication wiring in a case of transmitting a program via a network such as the Internet or a communication line such as a telephone line; and one which holds a program for a certain time period like a non-volatile memory inside a computer system serving as a server or a client in the aforementioned case of transmitting the program. Besides, the program may implement a part of the aforementioned function, and furthermore, may be capable of implementing the aforementioned function in combination with a program already recorded in the computer system.

SUMMARY

According to these embodiments, a radio includes: an electronic component which operates at a frequency λ1; an antenna sub-element which operates at a frequency λ2; and a radio circuit unit. At least one wiring among wirings of the electronic component and the antenna sub-element are connected via a frequency filter member which forms an open-circuit connection at the frequency λ1 and forms a short-circuit connection at the frequency λ2. The electronic component can be operated as a monopole antenna by connecting the radio circuit unit and the other end of the antenna sub-element with each other, and then by performing antenna feeding thereto. Since the electronic component is also utilized as an antenna, the antenna in the radio can be reduced in size.

INDUSTRIAL APPLICABILITY

The present invention can be utilized as an antenna of a radio.

The invention claimed is:

1. A radio characterized by comprising:
   an electronic component which includes a first terminal and a second terminal that are provided within a connection path between the electronic component and a control circuit unit;
   the control circuit unit which is connected to the electronic component and which controls the electronic component at a first frequency;
   a radio circuit unit which is connected to the electronic component's first terminal and second terminal and a ground, and which operates at a second frequency different from the first frequency, the radio characterized in that
   the electronic component is not electrically connected to the ground at the second frequency;
   one first high-frequency short-circuit unit connected to one of the terminals of the electronic component which is inserted between the electronic component and the radio circuit unit and which forms a connection between the electronic component and the radio circuit unit so that the connection therebetween has a high impedance at the first frequency and has a low impedance at the second frequency; and
   a second high-frequency short-circuit unit which is connected to the first terminal and the second terminal and which forms a connection between the first terminal and the second terminal so that the connection therebetween has a high impedance at the first frequency and has a low impedance at the second frequency.

2. The radio according claim 1, characterized by comprising a high-frequency cutoff unit which is inserted between the electronic component and the control circuit unit and which forms a connection between the electronic component and the control circuit unit so that the connection therebetween has a high impedance at the second frequency.

3. The radio according to claim 1, characterized in that the radio comprises a reinforcing shield member which reinforces the electronic component, and antenna feeding is performed to the reinforcing shield member.

4. A radio characterized by comprising:
   an electronic component which includes a first terminal and a second terminal that are provided within a connection path between the electronic component and a control circuit unit;
   the control circuit unit which is connected to the electronic component and which controls the electronic component at a first frequency;
   a radio circuit unit which is connected to the electronic component's first terminal and second terminal and a ground, which operates at a second frequency different from the first frequency, the radio characterized in that
   the electronic component is not electrically connected to the ground at the second frequency;
   one first high-frequency short-circuit unit connected to one of the terminals of the electronic component which is inserted between the electronic component and the radio circuit unit and which forms a connection between the electronic component and the radio circuit unit so that the connection therebetween has a high impedance at the first frequency and has a low impedance at the second frequency; and
   second high-frequency short-circuit units which are connected to the first terminal and the second terminal and which form a connection between the first terminal and the second terminal so that the connection therebetween has a high impedance at the first frequency and has a low impedance at the second frequency, characterized in that antenna feeding is performed to all of the terminals of the electronic component and feeding to each terminal is performed by the second frequency short-circuit units.

* * * * *